US012598244B2

(12) United States Patent
Kim et al.

(10) Patent No.: US 12,598,244 B2
(45) Date of Patent: Apr. 7, 2026

(54) METHOD AND APPARATUS FOR TRANSMITTING DATA IN MOBILE COMMUNICATION SYSTEM

(71) Applicant: Samsung Electronics Co., Ltd., Suwon-si (KR)

(72) Inventors: Sunhyun Kim, Suwon-si (KR); Dongmyung Kim, Suwon-si (KR); Sunghwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 361 days.

(21) Appl. No.: 18/365,557

(22) Filed: Aug. 4, 2023

(65) Prior Publication Data

US 2024/0073300 A1 Feb. 29, 2024

(30) Foreign Application Priority Data

Aug. 23, 2022 (KR) ........................ 10-2022-0105206

(51) Int. Cl.
*H04L 69/22* (2022.01)
*H04L 41/16* (2022.01)

(52) U.S. Cl.
CPC .................................... *H04L 69/22* (2013.01)

(58) Field of Classification Search
None
See application file for complete search history.

(56) References Cited

U.S. PATENT DOCUMENTS

| | | | | |
|---|---|---|---|---|
| 9,992,109 | B2 | 6/2018 | Wang et al. | |
| 10,911,326 | B2 | 2/2021 | Han et al. | |
| 11,496,396 | B1 * | 11/2022 | Kunc | H04L 69/22 |
| 2010/0316052 | A1 * | 12/2010 | Petersen | H04L 45/00 370/392 |
| 2018/0014225 | A1 * | 1/2018 | Yang | H04W 28/0215 |
| 2020/0244573 | A1 | 7/2020 | Cui et al. | |

(Continued)

FOREIGN PATENT DOCUMENTS

| | | |
|---|---|---|
| JP | 2016-528751 A | 9/2016 |
| KR | 10-0690845 B1 | 3/2007 |

(Continued)

OTHER PUBLICATIONS

3GPP TR 23.700-60, 3rd Generation Partnership Project; Technical Specification Group Services and System Aspects; Study on XR (Extended Reality) and media services(Release 18), May 31, 2022.

(Continued)

*Primary Examiner* — Duc T Duong
(74) *Attorney, Agent, or Firm* — Jefferson IP Law, LLP

(57) ABSTRACT

A data transmission method and apparatuses in a wireless communication system are provided. More particularly, a method performed by a first node in a wireless communication system is provided. The method includes receiving header configuration information from a second node, if header configuration information indicates to contain first data including one or more of network management information and user service provision information into a header, transmitting a packet including the first data and additional information for parsing the first data to the second node, and receiving a response to the first data from the second node which receives the packet.

20 Claims, 26 Drawing Sheets

(56) References Cited

U.S. PATENT DOCUMENTS

| | | | | |
|---|---|---|---|---|
| 2021/0219174 | A1* | 7/2021 | Xu | H04L 69/324 |
| 2024/0334302 | A1* | 10/2024 | Fujishiro | H04L 45/22 |
| 2024/0396832 | A1* | 11/2024 | Visa | H04W 40/248 |

FOREIGN PATENT DOCUMENTS

| | | | |
|---|---|---|---|
| KR | 10-1875341 | B1 | 7/2018 |
| KR | 10-2019-0132898 | A | 11/2019 |
| WO | 2022077199 | A1 | 12/2016 |
| WO | 2020/032769 | A1 | 2/2020 |
| WO | 2016200399 | A1 | 4/2022 |

OTHER PUBLICATIONS

P8: P4 With Predictable Packet Processing Performance, Nov. 2020.
International Search report and written opinion dated Nov. 13, 2023, issued in International Application No. PCT/KR2023/011457.

* cited by examiner

START

RECEIVE HEADER CONFIGURATION INFORMATION FROM SECOND NODE ~910

DETERMINE TO TRANSMIT AI/ML DATA CONTAINED IN PACKET PAYLOAD ACCORDING TO HEADER CONFIGURATION INFORMATION ~920

930
TRANSMIT AI/ML DATA USING AI DATA HEADER INFORMATION TABLE?

NO

TRANSMIT AI/ML DATA IN FORM OF PLAIN TEXT ~960

YES

TRANSMIT AI/ML DATA TO SECOND NODE BY INSERTING INTO AI DATA HEADER INFORMATION TABLE ~940

RECEIVE FEEDBACK OF AI/ML DATA ~950

END

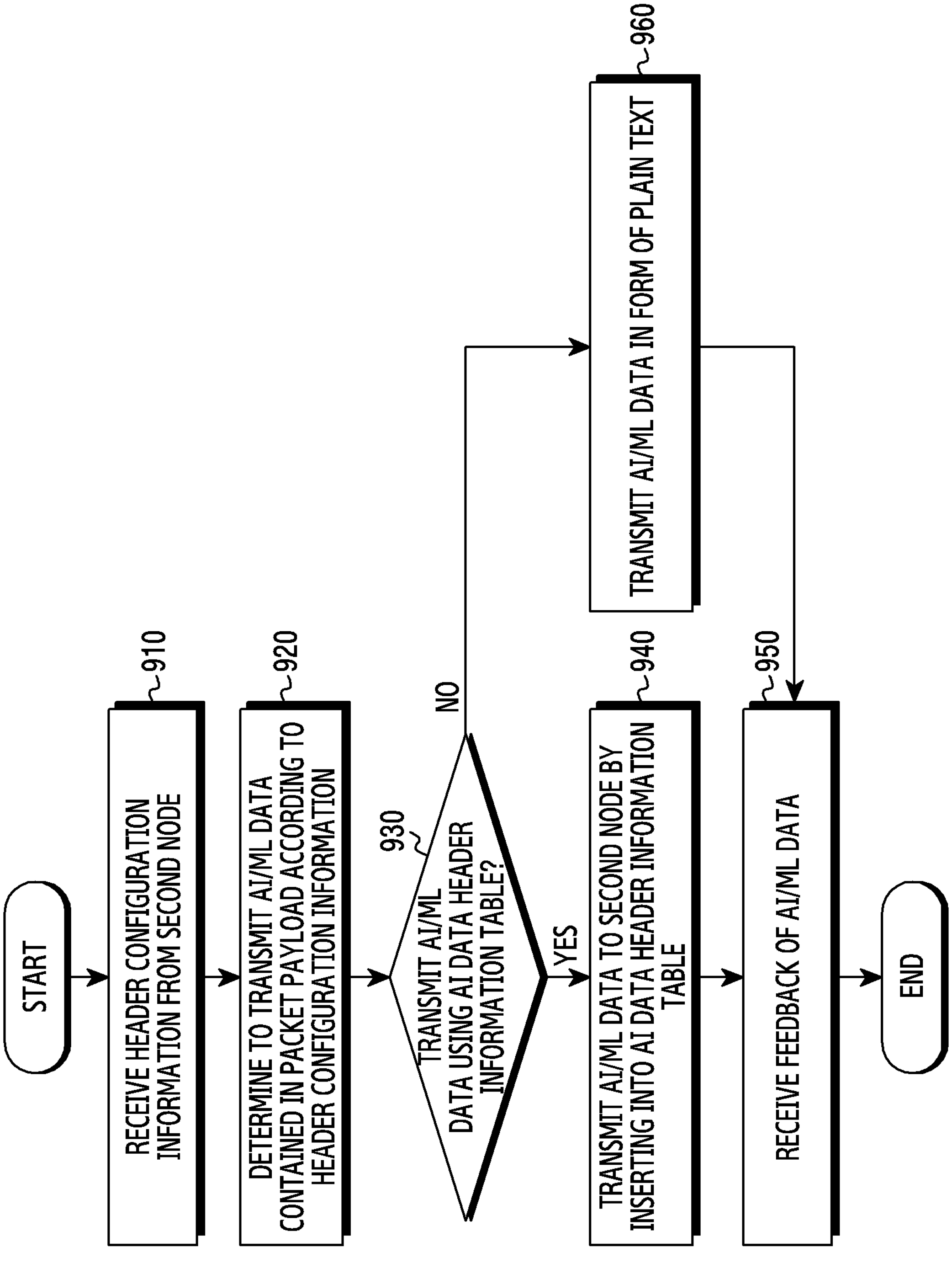

FIG.9

| BIT OFFSET | 0 | | | | | | | |
|---|---|---|---|---|---|---|---|---|
| | 0 | 1 | 2 | 3 | 4 | 5 | 6 | 7 |
| 0 ~ 11 | GTP-U HEADER WITHOUT EXTENSION | | | | | | | |
| 12 | NEXT EXTENSION HEADER TYPE | | | | | | | |
| 13 | EXTENSION HEADER LENGTH | | | | | | | |
| 14 | T | AI/ML DATA | | | | | | |
| 15 | AI/ML DATA (CONTINUE) | | | | | | | |
| ... | | | | | | | | |
| 15 + N | NEXT EXTENSION HEADER TYPE | | | | | | | |

SOLUTION 1

FIG.15

| BIT OFFSET | 0 | | | | | | | |
|---|---|---|---|---|---|---|---|---|
| | 0 | 1 | 2 | 3 | 4 | 5 | 6 | 7 |
| 0 ~ 11 | GTP-U HEADER WITHOUT EXTENSION | | | | | | | |
| 12 | NEXT EXTENSION HEADER TYPE | | | | | | | |
| 13 | EXTENSION HEADER LENGTH | | | | | | | |
| 14 | T | AI/ML DATA IDENTIFIER (I) | | | | | | |
| 15 | AI/ML DATA | | | | | | | |
| 16 | AI/ML DATA (CONTINUE) | | | | | | | |
| ... | | | | | | | | |
| 16 + N | NEXT EXTENSION HEADER TYPE | | | | | | | |

SOLUTION 2

FIG.16 gNB FR1 BWP1 CHANNEL UTILIZATION : 95% (6bits, unit=5%)
gNB FR2 BWP2 CHANNEL UTILIZATION : 95% (6bits, unit=5%)
THE NUMBER OF ACTIVE USERS IN gNB : 489 (10bit)
POWER CONSUMPTION IN gNB: 7000W (8bit, unit=30W)

AI/ML HEADER EXAMPLE

```
{
"gNB FR1 BWP1 CHANNEL UTILIZATION ": 95%,
"gNB FR2 BWP2 CHANNEL UTILIZATION ": 95%,
"THE NUMBER OF ACTIVE USERS IN gNB": 489,
"POWER CONSUMPTION IN gNB": 7000W
}
```

AI/ML PLAIN TEXT(JSON) EXAMPLE

METHOD AND APPARATUS FOR TRANSMITTING DATA IN MOBILE COMMUNICATION SYSTEM

CROSS-REFERENCE TO RELATED APPLICATION(S)

This application is based on and claims priority under 35 U.S.C. § 119(a) of a Korean patent application number 10-2022-0105206, filed on Aug. 23, 2022, in the Korean Intellectual Property Office, the disclosure of which is incorporated by reference herein in its entirety.

BACKGROUND

1. Field

The disclosure relates to a mobile communication system or a wireless communication system. More particularly, the disclosure relates to a method and an apparatus for transmitting data using a packet header in the mobile communication system.

2. Description of Related Art

Considering development through wireless communication generations, technologies such as voice call, multimedia, and data have been developed mainly for human centered services. It is expected that connected devices exponentially growing after $5^{th}$ generation (5G) communication system commercialization will be connected to a communication network. Examples of things connected to the network may include a vehicle, a robot, a drone, a home appliance, a display, a smart sensor installed in various infrastructures, construction machine, factory equipment and so on. A mobile device is expected to evolve into various form factors such as augmented reality glasses, a virtual reality headset, and a hologram device. To provide various services by connecting hundreds of billions of devices and things in a $6^{th}$ generation (6G) era, efforts are exerted to develop an improved 6G communication system. For this reason, the 6G communication system is referred to as a beyond 5G system.

In the 6G communication system which is expected to be realized around 2030, a peak data rate is tera (i.e., 1,000 giga) bits per second (bps), and radio latency is 100 μsec. That is, compared to the 5G communication system, the data rate of the 6G communication system is 50 times faster and the radio latency is reduced to 1/10.

To achieve such high data rate and ultra low latency, the 6G communication system is considering implementation in a terahertz (THz) band (e.g., 95 GHz through 3 THz bands). It is expected that technologies for securing a signal transmission distance, that is, coverage grow in importance due to worse path loss and atmospheric absorption in the terahertz bands than millimeter waves (mmWave) band adopted into the 5G. As major technologies for securing the coverage, it is required to develop a radio frequency (RF) element, an antenna, a novel waveform having better coverage than orthogonal frequency division multiplexing (OFDM), beamforming and a multiantenna transmission technology such as massive multiple-input and multiple-output (MIMO), full dimensional (FD)-MIMO, an array antenna, multi-antenna transmission techniques such as large scale antennas and so on. Besides, new technologies for improving the terahertz band signal coverage, such as metamaterial based lens and antenna, high dimensional spatial multiplexing using orbital angular momentum (OAM), and reconfigurable intelligent surface (RIS) are under discussion.

For spectral efficiency improvement and system network enhancement, the 6G communication system is developing a full duplex technology for allowing an uplink and a downlink to simultaneously utilize the same frequency resource at the same time, a network technology for utilizing a satellite and high-altitude platform stations (HAPS) in an integrated manner, a network structure innovative technology for supporting a mobile base station and enabling network operation optimization and automation, a dynamic spectrum sharing technology through collision avoidance based on spectrum usage prediction, an artificial intelligence (AI) based communication technology for achieving system optimization by utilizing AI from a designing phase and internalizing an end-to-end AI support function, a next-generation distributed computing technology for realizing a service of complexity overcoming terminal computation capability by utilizing super high performance communication and computing resources (mobile edge computing (MEC), clouds, etc.) and so on. Besides, attempts continue to strengthen connectivity between devices, to optimize the network, to promote network entity softwarization, and to increase wireless communication openness through designing a new protocol to be used in the 6G communication system, developing mechanisms for implementing a hardware based security environment and safe data use, and developing a technology for maintaining privacy.

It is expected that the research and the development of the 6G communication system allow next hyper-connected experience through hyper-connectivity of the 6G communication system, embracing person to machine connection as well as machine to machine connection. Particularly, it is expected that services such as truly immersive extended reality (XR), high-fidelity mobile hologram, and digital replica may be provided through the 6G communication system. In addition, services such as remote surgery through security and reliability enhancement, industrial automation and emergency response may be provided through the 6G communication system, to be applied in various fields such as industry, medical care, automobile, and home appliances.

In recent, based on the advances of the communication system, a demand for a solution for efficiently managing a network by utilizing an AI/machine learning (ML) model is increasing.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method capable of effectively providing a service in a wireless communication system.

Additional aspects will be set forth in part in the description which follows and, in part, will be apparent from the description, or may be learned by practice of the presented embodiments.

In accordance with an aspect of the disclosure, a method of operating a first node in a wireless communication system is provided. The method includes receiving header configuration information from a second node, if header configuration information indicates to contain first data including one or more of network management information and user service provision information into a header, transmitting a packet including the first data and additional information for parsing the first data to the second node, and receiving a response to the first data from the second node which receives the packet, and the first data and the additional information may be contained in the header of the packet.

In accordance with another aspect of the disclosure, a method of operating a second node in a wireless communication system is provided. The method includes transmitting header configuration information to a first node, if header configuration information indicates to contain first data including one or more of network management information and user service provision information into a header, receiving a packet including the first data and additional information for parsing the first data from the first node, and transmitting a response to the first data to the first node.

In accordance with another aspect of the disclosure, an apparatus of a first node in a wireless communication system is provided. The apparatus includes a transceiver and a controller, the controller may be configured to receive header configuration information from a second node, if header configuration information indicates to contain first data including one or more of network management information and user service provision information into a header, transmit a packet including the first data and additional information for parsing the first data to the second node, and receive a response to the first data from the second node which receives the packet, and the first data and the additional information may be contained in the header of the packet.

In accordance with another aspect of the disclosure, an apparatus of a second node in a wireless communication system is provided. The apparatus includes a transceiver and a controller, and the controller may be configured to transmit header configuration information to a first node, if header configuration information indicates to contain first data including one or more of network management information and user service provision information into a header, receive a packet including the first data and additional information for parsing the first data from the first node, and transmit a response to the first data to the first node.

Various embodiments of the disclosure provide an apparatus and a method for effectively providing a service in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 illustrates an AI/ML data transmission method according to an embodiment of the disclosure;

FIG. 15 illustrates a GTP-U header format structure according to an embodiment of the disclosure;

FIG. 16 illustrates a GTP-U header format structure according to an embodiment of the disclosure;

The same reference numerals are used to represent the same elements throughout the drawings.

DETAILED DESCRIPTION

Figure 1:
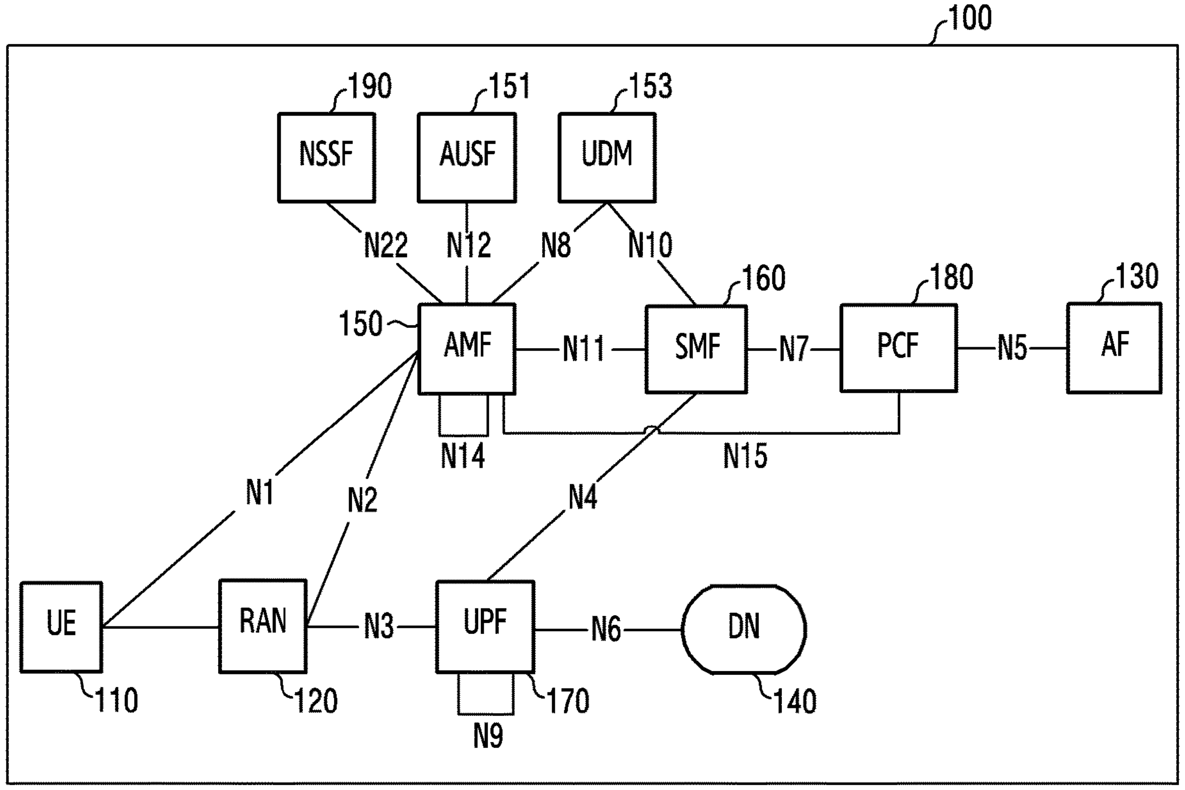
FIG. 1 illustrates a communication network including core network entities (or core network functions) in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some components in the accompanying drawings are exaggerated, omitted, or schematically illustrated. Also, a size of each component does not entirely reflect an actual size. The same reference number is given to the same or corresponding element in each drawing.

Advantages and features of the disclosure, and methods for achieving them will be clarified with reference to embodiments described below in detail together with the accompanying drawings. However, the disclosure is not limited to the embodiments disclosed below but may be implemented in various different forms, the embodiments are provided to only complete the scope of the disclosure and to allow those skilled in the art to which the disclosure pertains to fully understand a category of the disclosure, and the disclosure is solely defined within the scope of the claims. The same reference numeral refers to the same element throughout the specification. Also, in describing the embodiment of the disclosure, a detailed description of a related known function or configuration will be omitted if it is deemed to make the gist of the embodiment of the disclosure unnecessarily vague. Terms to be described hereafter have been defined by taking into consideration functions in the disclosure, and may differ depending on a user or an operator's intention or practice. Accordingly, they should be defined based on contents throughout the entire specification.

Hereafter, a base station is an entity for performing resource allocation of a terminal, and may be at least one of a gNode B (gNB), an eNode B (eNB), a NodeB, a base station (BS), a radio access unit, a base station controller, or a node on the network. The terminal may include a user equipment (UE), a mobile station (MS), a cellular phone, a smartphone, a computer, or a multimedia system for executing a communication function. In the disclosure, a downlink (DL) indicates a radio transmission path of a signal from the base station to the terminal, and an uplink (UL) indicates a radio transmission path of a signal from the terminal to the base station. In addition, a long term evolution (LTE) system or an LTE-advanced (LTE-A) system may be described as an example, but embodiments of the disclosure may be applied to other communication systems having similar technical backgrounds or channel forms. For example, a $5^{th}$ generation (5G) mobile communication technology (new radio (NR)) developed after LTE-A may be included thereto, and the 5G may embrace the existing LTE and LTE-A and other similar services. In addition, the disclosure may be applied to other communication systems through some modification without significantly departing from the range of the disclosure based on determination of those skilled in the technical knowledge.

At this time, it will be understood that each block of the process flowchart illustrations and combinations of the flowchart illustrations may be executed by computer program instructions. Since these computer program instructions may be mounted on a processor of a general purpose computer, a special purpose computer or other programmable data processing apparatus, the instructions executed by the processor of the computer or other programmable data processing equipment may generate means for executing functions described in the flowchart block(s). Since these computer program instructions may also be stored in a computer-usable or computer-readable memory which may direct a computer or other programmable data processing equipment to function in a particular manner, the instructions stored in the computer-usable or computer-readable memory may produce a manufacture article including instruction means which implement the function described in the flowchart block(s). Since the computer program instructions may also be loaded on a computer or other programmable data processing equipment, a series of operational steps may be performed on the computer or other programmable data processing equipment to produce a computer-executed process, and thus the instructions performing the computer or other programmable data processing equipment may provide steps for executing the functions described in the flowchart block(s).

In addition, each block may represent a portion of a module, a segment or code which includes one or more executable instructions for implementing a specified logical function(s). Also, it should be noted that the functions mentioned in the blocks may occur out of order in some alternative implementations. For example, two blocks shown in succession may in fact be executed substantially concurrently or the blocks may sometimes be executed in the reverse order depending on corresponding functionality.

The term '~unit or part' as used in the disclosure indicates software or a hardware component such as a field programmable gate array (FPGA) or an application-specific integrated circuit (ASIC), and '~unit' performs specific roles. However, '~unit' is not limited to software or hardware. '~unit' may be configured to reside on an addressable storage medium and configured to reproduce on one or more processors. Accordingly, '~unit' may include, for example, components such as software components, object-oriented software components, class components and task components, processes, functions, attributes, procedures, sub-routines, segments of program code, drivers, firmware, microcode, circuitry, data, databases, data structures, tables, arrays, and variables. The functionalities provided in the components and '~unit' may be combined to fewer components and '~units' or may be further separated into additional components and '~units'. Further, the components and '~units' may be implemented to reproduce one or more central processing units (CPUs) within a device or a security multimedia card. Also, '~unit' in the embodiment may include one or more processors.

Hereafter, for the convenience of description, some of terms and names defined in 3rd generation partnership project (3GPP) based communication standards (e.g., 5G, NR, LTE or a similar system standard) may be used.

However, the disclosure is not limited by these terms and names, and may be applied to systems conforming to other standards in the same manner.

Hereafter, terms for identifying access nodes, terms indicating network entities, terms indicating messages, terms indicating interfaces between network entities, terms indicating various identification information, and the like are illustratively used in the description for the sake of convenience. Accordingly, the disclosure is not limited by the terms as used, and other terms indicating subjects having equivalent technical meanings may be used.

Hereafter, the disclosure relates to a method and an apparatus for transmitting artificial intelligence (AI)/machine learning (ML) data in a mobile communication system (or a wireless communication system). Specifically, the disclosure describes a technique for a base station to receive configuration information of an AI data header information table from a core network to transmit AI/ML data for network management to the core network, and to transmit AI/ML data headered based on the received configuration information to the core network in the mobile communication system. In embodiments of the disclosure, the AI/ML data may include not only information for the base station to manage the network but also information for managing a service provided to a user. For example, the service provided to the user may include, but not limited to, a virtual reality (VR) service (or, augmented reality (AR), mixed reality (MR), extended reality (XR), substitutional reality (SR), etc.) and a service for providing a driver with analysis information obtained with various sensors (e.g., a camera, a radar, a laser imaging, detection, and ranging (LiDAR)) for autonomous driving.

Effects obtainable from the disclosure are not limited to the above-mentioned effects, and other effects which are not mentioned may be clearly understood by those skilled in the art of the disclosure through the following descriptions.

FIG. 1 illustrates a communication network 100 including core network entities (or core network functions) in a wireless communication system according to an embodiment of the disclosure. A 5G mobile communication network may include a 5G UE 110, a 5G RAN 120, and a 5G core network 200.

The 5G core network may include network functions such as an access and mobility management function (AMF) 150 which provides a mobility management function of the UE, a session management function (SMF) 160 which provides a session management function, a user plane function (UPF) 170 which delivers data, a policy control function (PCF) 180 which provides a policy and charging function, a unified data management (UDM) 153 which provides a data management function such as subscriber data or policy control data or a unified data repository (UDR) which stores data of various network functions.

Referring to FIG. 1, the UE 110 may perform communication over a radio channel built with a base station (e.g., an eNB, a gNB), that is, over an access network. In some embodiments, the UE 110 is a device used by a user, and may be configured to provide a user interface (UI). For example, the UE 110 may be a terminal equipped in a vehicle for driving. In some other embodiments, the UE 110 may be a device performing machine type communication (MTC) operated without user's involvement, or an autonomous vehicle. Besides an electronic device, the UE may be referred to as a 'terminal', a 'vehicle terminal', a 'UE', a 'mobile station', a 'subscriber station', a 'remote terminal', a 'wireless terminal', a 'user device' or other term having the equivalent technical meaning. As the terminal, a customer-premises equipment (CPE) or a dongle type terminal may be used besides the UE. The CPE is connected to an NG-RAN node like the UE, and may provide the network to other communication equipment (e.g., a laptop).

Referring to FIG. 1, the AMF 150 provides the function for the access and mobility management based on the UE 110, and one UE 110 may be basically connected to one AMF 150. Specifically, the AMF 150 may perform at least one function of signaling between core network nodes for mobility of 3GPP access networks, interfacing (N2 interface) between radio access networks (e.g., the 5G RAN) 120, non-access stratum (NAS) signaling with the UE 110, identifying the SMF 160, and delivering a session management (SM) message between the UE 110 and the SMF 160. Some or all of the functions of the AMF 150 may be supported within a single instance of one AMF 150.

Referring to FIG. 1, the SMF 160 provides the session management function. If the UE 110 has a plurality of sessions, the sessions may be managed by different SMFs 160 respectively. Specifically, the SMF 160 may perform at least one function of session management (e.g., session establishment, modification and release including tunnel maintenance between the UPF 170 and the AN node), user plane (UP) function selection and control, traffic steering configuration for routing traffic from the UPF 170 to a proper destination, termination of the SM part of the NAS message, downlink data notification (DDN), and an initiator of AN specific SM information (e.g., deliver to the AN through the N2 interface via the AMF 150). Some or all functions of the SMF 160 may be supported within a single instance of one SMF 160.

In the 3GPP system, conceptual links interconnecting network functions (NFs) within the 5G system may be referred to as reference points. The reference point may be referred to as an interface. The following illustrates reference points included in the 5G system architecture represented in FIGS. 1, 2A to 2D, 3A, 3B, and 4 to 7.

N1: a reference point between the UE 110 and the AMF 150

N2: a reference point between the (R)AN 120 and the AMF 150

N3: a reference point between the (R)AN 120 and the UPF 170

N4: a reference point between the SMF 160 and the UPF 170

N5: a reference point between the PCF 180 and the AF 130

N6: a reference point between the UPF 170 and the DN 140

N7: a reference point between the SMF 160 and the PCF 180

N8: a reference point between the UDM 153 and the AMF 150

N9: a reference point between two core UPFs 170

N10: a reference point between the UDM 153 and the SMF 160

N11: a reference point between the AMF 150 and the SMF 160

N12: a reference point between the AMF 150 and an authentication server function (AUSF) 151

N13: a reference point between the UDM 153 and the AUSF 151

N14: a reference point between two AMFs 150

Figure 2A:
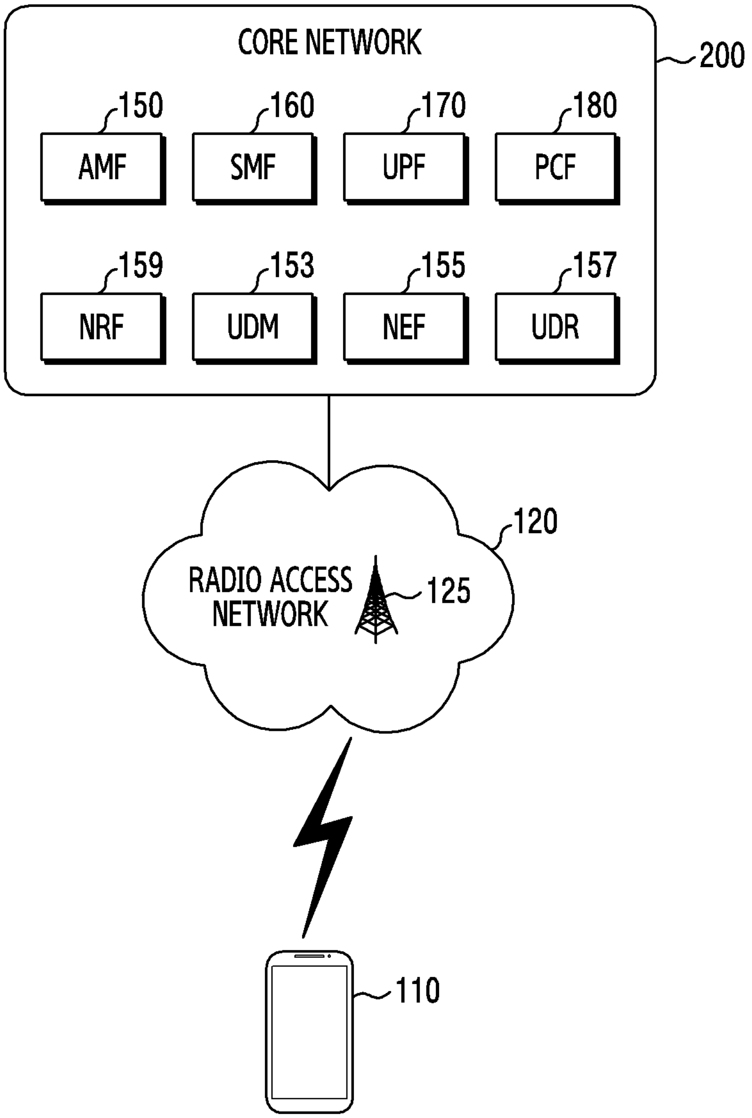
FIG. 2A illustrates a wireless environment including a core network in a wireless communication system according to an embodiment of the disclosure.

N15: a reference point between the PCF 180 and the AMF 150 in a non-roaming scenario, a reference point between the PCF 180 and the AMF 150 within a visited network in a roaming scenario FIG. 2A illustrates a wireless environment including a core network in a wireless communication system according to an embodiment of the disclosure.

Referring to FIG. 2A, the wireless communication system includes a RAN 120 and a core network (CN) 200.

The RAN 120 is a network directly connected to a user device, for example, the UE 110, and is an infrastructure which provides radio access to the UE 110. The RAN 120 may include a set of base stations including a base station 125, and the plurality of the base stations may perform communication via interfaces established between them. At least some of the interfaces between the plurality of the base stations may be wired or wireless. The base station 125 may have a structure divided into a central unit (CU) and a distributed unit (DU). In this case, a single CU may control a plurality of DUs. The base station 125 may be referred to as, in addition to the base station, an 'access point (AP)', a 'gNB', a '5G node', a 'wireless point', a 'transmission/reception point (TRP)', or other term having the equivalent technical meaning. The UE 110 accesses the RAN 120, and communicates with the base station 125 over a radio channel. The UE 110 may be referred to as, in addition to the terminal, a 'LT', a 'mobile station', a 'subscriber station', a 'remote terminal', a 'wireless terminal', a 'user device' or other term having the equivalent technical meaning.

The CN 200, which is a network for managing the whole system, controls the RAN 120 and processes data and control signals of the UE 110 transmitted or received over the RAN 120. The CN 200 performs various functions such as controlling the user plane and the control plane, processing mobility, managing subscriber information, charging, and interworking with systems of other types (e.g., the LTE system). To carry out the described various functions, the CN 200 may include a plurality of entities functionally separated with different NFs. For example, the CN 200 may include an AMF 150, an SMF 160, a UPF 170, the PCF 180, a network repository function (NRF) 159, a UDM 153, a network exposure function (NEF) 155, and a unified data repository (UDR) 157.

The UE 110 is connected to the RAN 120 to access the AMF 150 which performs the mobility management function of the CN 200. The AMF 150 may be a function or a device which manages both the access of the RAN 120 and the mobility of the UE 110. The SMF 160 is an NF which manages the session. The AMF 150 is connected to the SMF 160, and the AMF 150 routes a session related message of the UE 110 to the SMF 160. The SMF 160 is connected to the UPF 170 to allocate a user plane resource to be provided to the UE 110, and to establish a tunnel for transmitting data between the base station 125 and the UPF 170. The PCF 180 controls policy and charging related information of the session used by the UE 110. The NRF 159 stores information of NFs installed in the mobile communication provider network, and notifies the stored information. The NRF 159 may be connected to all of the NFs. The NFs each, if initiating its driving in the provider network, may register at the NRF 159 and thus notify the NRF 159 that the corresponding NF is operating in the network. The UDM 153 is an NF performing a similar role to a home subscriber server (HSS) of the 4G network, and stores subscription information of the UE 110, or context used by the UE 110 in the network.

The NEF 155 interconnects a $3^{rd}$ party server and the NF in the 5G mobile communication system. Also, the NEF 155 provides data to the UDR 157, or updates or acquires data. The UDR 157 stores the subscription information of the UE 110, stores the policy information, stores data exposed to outside, or stores necessary information of a $3^{rd}$ party application. In addition, the UDR 157 provides the stored data to other NF.

Figure 2B:
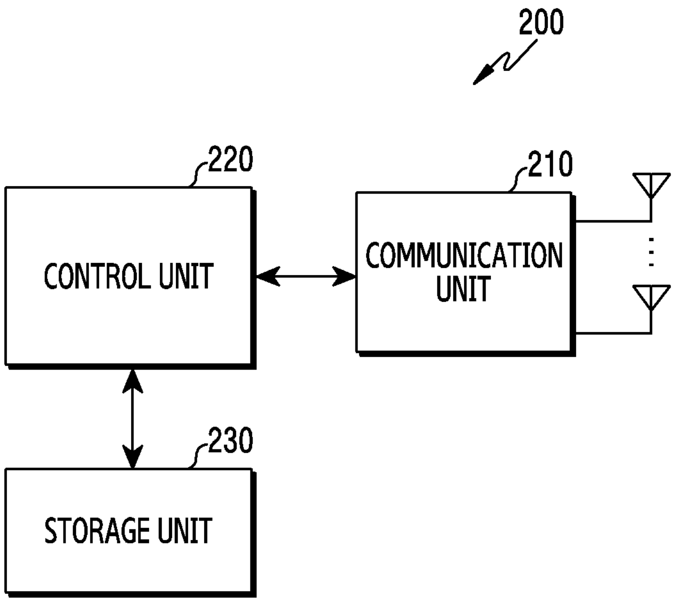
FIG. 2B illustrates a configuration of a core network entity in a wireless communication system according to an embodiment of the disclosure.

FIG. 2B illustrates a configuration of the core network entity in the wireless communication system according to an embodiment of the disclosure. The configuration of the core network 200 shown in FIG. 2B may be understood as the configuration of the device having at least one functionality AMF 150, UDM 153, NEF 155, UDR 157, SMF 160, UPF 170, PCF 180, and network slice selection functionality (NSSF) 190 of FIG. 1. Hereafter, a term such as '~unit' or '~er' used hereafter indicates a unit for processing at least one function or operation, and may be implemented using hardware, software, or a combination of hardware and software.

Referring to FIG. 2B, the core network entity includes a communication unit 210, a storage unit 230, and a control unit 220.

The communication unit 210 provides an interface for communicating with other devices in the network. That is, the communication unit 210 converts a bit stream transmitted from the core network entity to other device into a physical signal, and converts a physical signal received from other device into a bit stream. That is, the communication unit 210 may transmit and receive signals. Hence, the communication unit 210 may be referred to as a modem, a transmitter, a receiver or a transceiver. In this case, the communication unit 210 enables the core network entity to communicate with other devices or systems via a backhaul connection (e.g., wired backhaul or wireless backhaul) or the network.

The storage unit 230 stores data such as a basic program, an application program, and setting information for the operations of the core network entity. The storage unit 230 may be configured with a volatile memory, a non-volatile memory, or a combination of a volatile memory and a non-volatile memory. The storage unit 230 provides the stored data at a request of the control unit 220.

The control unit 220 controls general operations of the core network entity. For example, the control unit 220 transmits and receives a signal through the communication unit 210. In addition, the control unit 220 records and reads data in and from the storage unit 230. For doing so, the control unit 220 may include at least one processor. According to various embodiments of the disclosure, the control unit 220 may control to perform synchronization using the wireless communication network. For example, the control unit 220 may control the core network entity to perform operations according to various embodiments to be described.

Figure 2C:
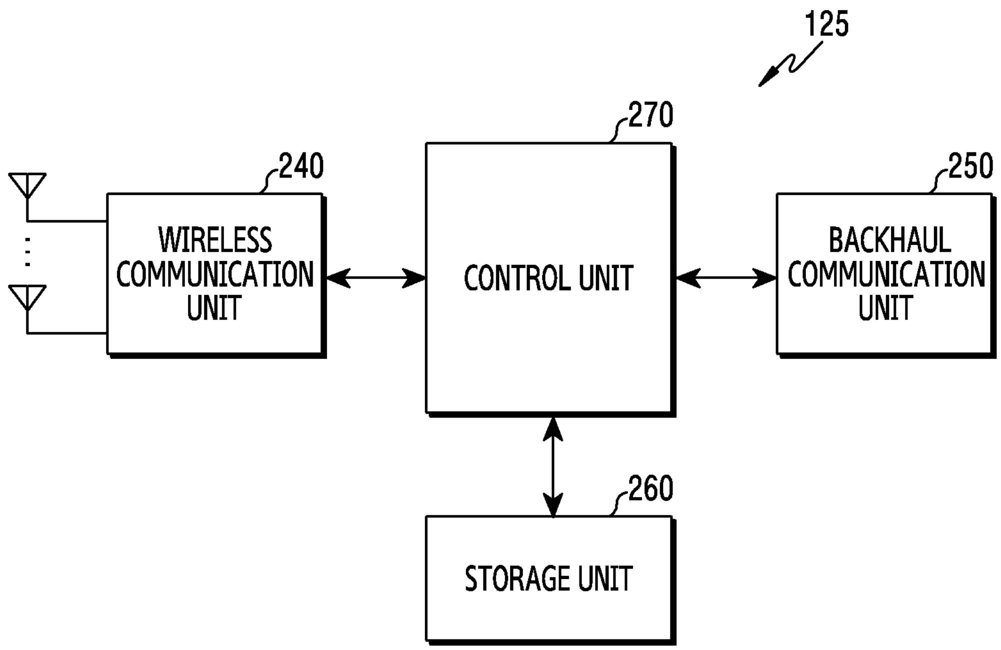
FIG. 2C illustrates a configuration of a base station in a wireless communication system according to an embodiment of the disclosure.

FIG. 2C illustrates a configuration of the base station in the wireless communication system according to an embodiment of the disclosure. The configuration illustrated in FIG. 2C may be understood as the configuration of the base station 125. Hereafter, a term such as 'unit' or '—er' used hereafter indicates a unit for processing at least one function or operation, and may be implemented using hardware, software, or a combination of hardware and software.

Referring to FIG. 2C, the base station 125 includes a wireless communication unit 240, a backhaul communication unit 250, a storage unit 260, and a control unit 270.

The wireless communication unit 240 performs functions for transmitting or receiving a signal over a radio channel. For example, the wireless communication unit 240 performs a conversion function between a baseband signal and a bit stream according to a physical layer standard of the system. For example, in data transmission, the communication unit

240 generates complex symbols by encoding and modulating a transmit bit stream. Also, in data reception, the wireless communication unit 240 restores a receive bit stream by demodulating and decoding a baseband signal.

Also, the wireless communication unit 240 up-converts a baseband signal into an RF band signal and transmits the same via an antenna, and down-converts an RF band signal received through an antenna into a baseband signal. For doing so, the wireless communication unit 240 may include a transmit filter, a receive filter, an amplifier, a mixer, an oscillator, a digital to analog converter (DAC), an analog to digital converter (ADC), and the like. Also, the wireless communication unit 240 may include a plurality of transmit and receive paths. Further, the wireless communication unit 240 may include at least one antenna array including a plurality of antenna elements.

In terms of hardware, the wireless communication unit 240 may include a digital circuit and an analog circuit, and the analog unit may include a plurality of sub-units according to an operating power, an operating frequency, and so on. The digital unit may be implemented with at least one processor (e.g., a digital signal processor (DSP)).

The wireless communication unit 240 transmits and receives the signal as described above. Accordingly, whole or a part of the wireless communication unit 240 may be referred to as a 'transmitter', a 'receiver', or a 'transceiver'. In addition, in the following description, the transmission and reception conducted over the radio channel may be used to embrace the above-described processing performed by the wireless communication unit 240.

The backhaul communication unit 250 provides an interface for communicating with other nodes in the network. That is, the backhaul communication unit 250 converts a bit stream transmitted from the base station to other node, for example, other access node, another base station, an upper node, the core network, and so on, into a physical signal, and converts a physical signal received from other node into a bit stream.

The storage unit 260 stores data such as a basic program, an application program, and setting information for the operations of the base station. The storage unit 260 may be configured with a volatile memory, a non-volatile memory or a combination of a volatile memory and a non-volatile memory. The storage unit 260 provides the stored data at a request of the control unit 270.

The control unit 270 controls general operations of the base station. For example, the control unit 270 transmits and receives a signal through the wireless communication unit 240 or the backhaul communication unit 250. In addition, the control unit 270 records and reads data in and from the storage unit 260. The control unit 270 performs functions of a protocol stack required by the communication standard. According to another implementation, the protocol stack may be included in the wireless communication unit 240. For doing so, the control unit 270 may include at least one processor.

According to various embodiments, the control unit 270 may control the base station to perform operations to be described below according to the various embodiments.

Figure 2D:
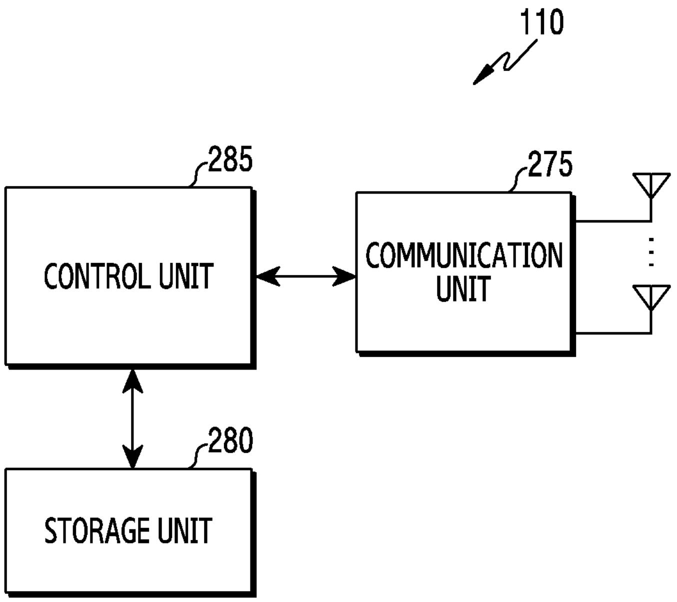
FIG. 2D illustrates a configuration of a terminal in a wireless communication system according to an embodiment of the disclosure.

FIG. 2D illustrates a configuration of the terminal in the wireless communication system according to an embodiment of the disclosure. The configuration illustrated in FIG. 2D may be understood as the configuration of the UE 110. Hereafter, a term such as 'unit' or '—er' used hereafter indicates a unit for processing at least one function or operation, and may be implemented using hardware, software, or a combination of hardware and software.

Referring to FIG. 2D, the user terminal 110 includes a communication unit 275, a storage unit 280, and a control unit 285.

The communication unit 275 performs functions for transmitting or receiving a signal over a radio channel. For example, the communication unit 275 performs a conversion function between a baseband signal and a bit stream according to the physical layer standard of the system. For example, in data transmission, the communication unit 275 generates complex symbols by encoding and modulating a transmit bit stream. Also, in data reception, the communication unit 275 restores a receive bit stream by demodulating and decoding a baseband signal. Also, the communication unit 275 up-converts a baseband signal into a radio frequency (RF) band signal and transmits the same via an antenna, and down-converts an RF band signal received through an antenna into a baseband signal. For example, the communication unit 275 includes a transmit filter, a receive filter, an amplifier, a mixer, an oscillator, a digital to analog converter (DAC), an analog to digital converter (ADC), and so on.

Also, the communication unit 275 may include a plurality of transmit and receive paths. Further, the communication unit 275 may include at least one antenna array including a plurality of antenna elements. In terms of hardware, the communication unit 275 may include a digital circuit and an analog circuit (e.g., a radio frequency integrated circuit (RFIC)). Herein, the digital circuit and the analog circuit may be implemented in a single package. The communication unit 275 may include a plurality of RF chains. Further, the communication unit 275 may perform beamforming.

The communication unit 275 transmits and receives the signal as described above. Accordingly, whole or a part of the communication unit 275 may be referred to as a 'transmitter', a 'receiver', or a 'transceiver'. Also, the transmission and reception conducted over the radio channel is used to embrace the above-described processing performed by the communication unit 275 in the following description.

The storage unit 280 stores data such as a basic program, an application program, and setting information for the operation of the terminal. The storage unit 280 may be configured with a volatile memory, a non-volatile memory, or a combination of a volatile memory and a non-volatile memory. The storage unit 280 provides the stored data at a request of the control unit 285.

The control unit 285 controls general operations of the terminal. For example, the control unit 285 transmits and receives a signal through the communication unit 275. In addition, the control unit 285 records and reads data in and from the storage unit 280. The control unit 285 may perform functions of the protocol stack required by the communication standard. For doing so, the control unit 285 may include at least one processor or a micro-processor, or may be a part of a processor. A part of the communication unit 275 and the control unit 285 may be referred to as a communication processor (CP).

According to various embodiments, the control unit 285 may control the terminal to perform operations according to various embodiments to be described.

Hereafter, terms for identifying access nodes, terms indicating network entities, terms indicating messages, terms indicating interfaces between network entities, terms indicating various identification information, and the like are illustratively used in the description for the sake of convenience. Accordingly, the disclosure is not limited by the terms as used, and other terms indicating subjects having equivalent technical meanings may be used.

The specific description of embodiments of the disclosure is mainly based on the NR which is the radio access network and a packet core (the 5G system, a 5G core network, or a next generation (NG) core) which is the core network on the 5G mobile communication standards specified by the 3GPP which is the mobile communication standardization organization, but the main subject of the disclosure may be applied to other communication systems having a similar technical background with slight modification without departing from the scope of the disclosure, which may be determined by those skilled in the art of the disclosure.

To support network automation, the 5G system may define a network data collection and analysis function (NWDAF) which is an NF for analyzing and providing data collected from the 5G network. The NWDAF may collect/store/analyze information from the 5G network and provide results to at least one NF, and the analysis result may be used independently in each NF.

The 5G mobile communication system may support NFs to use the results of collecting and analyzing network related data (hereafter, referred to as network data) through the NWDAF. It can provide centralized collection and analysis of the network data that each NF needs in order to effectively deliver the capabilities they offer. The NWDAF may perform the network data collection and analysis on a network slice basis. However, the scope of the disclosure is not limited to the network slice, and the NWDAF may additionally analyze various information (e.g., service quality) obtained from a UE, a PDU session, an NF state, or an external service server.

The analysis result from the NWDAF may be delivered to each NF requesting the analysis result, and used to optimize network management functions such as quality of service (QoS) guarantee/improvement, traffic control, mobility management, or load balancing.

Figure 3A:
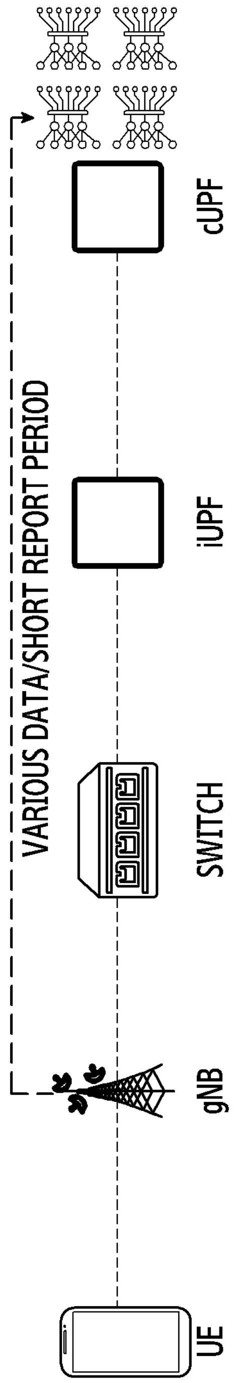
FIG. 3A illustrates a process for transmitting data to an artificial intelligence (AI)/machine learning (ML) model according to an embodiment of the disclosure.

FIG. 3A illustrates a process for transmitting data to an AI/ML model according to an embodiment of the disclosure.

Referring to FIG. 3A, a gNB transmits various AI/ML data to a central UPF (cUPF) of a CN.

Existing network management system (NMS) and NWDAF may use a plurality of AI/ML models to optimize the network management functions. If only one entity has AI/ML models in the CN, a collection data reporting frequency and a data size to be used in the AI/ML model may be adjusted for elaborate network management. In so doing, as the AI/ML data reporting frequency (e.g., reporting every 30 ms), traffic load may increase. In addition, the gNB may transmit the AI/ML data through an additional packet of a plain text format (e.g., hypertext transfer protocol (HTTP) or javascript object notation (JSON)), and the data size may further increase if the additional packet is transmitted. Hence, a multi-tier AI/ML model may be considered to address the traffic load increase and the data size increase according to the frequency increase of the data reporting.

Figure 3B:
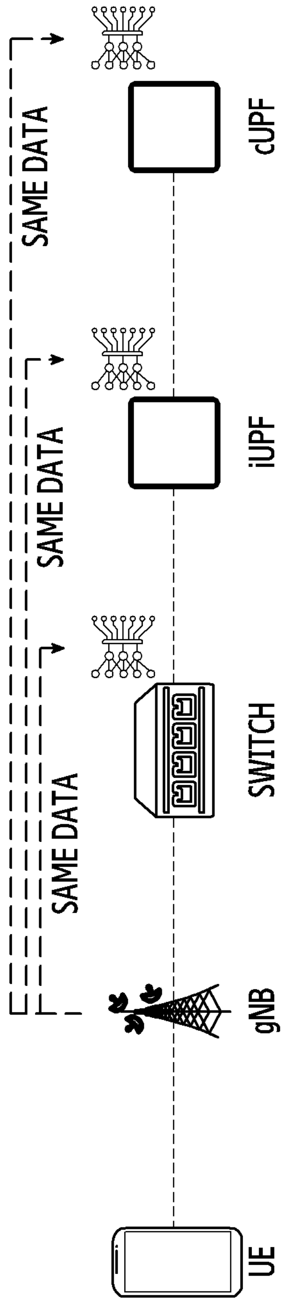
FIG. 3B illustrates a process for transmitting data to a multi-tier AI/ML model according to an embodiment of the disclosure.

FIG. 3B illustrates a process for transmitting data to the multi-tier AI/ML model according to an embodiment of the disclosure.

Referring to FIG. 3B, the gNB may transmit the same AI/ML data to AI/ML models distributed in the multi-tier.

The multi-tier AI/ML model may be used in operations, administration and maintenance (OAM), management data analytics service (MDAS), a switch, an NSDAF in the CN. The OAM may indicate a process (or, a service, a function, a tool) related to operation, management, and maintenance in the communication network. The MDAS may indicate a process (or, a service, a function, a tool) related to management data analytics in the communication network. Meanwhile, a plurality of AI/ML models of the same purpose is distributed in the multi-tier structure according to the CN structure mentioned earlier. If the base station transmits the same AI/ML data to the AI/ML models distributed in the multi-tier structure, redundant transmission of the same data, which is small in size, may cause inefficiency.

Figure 4:
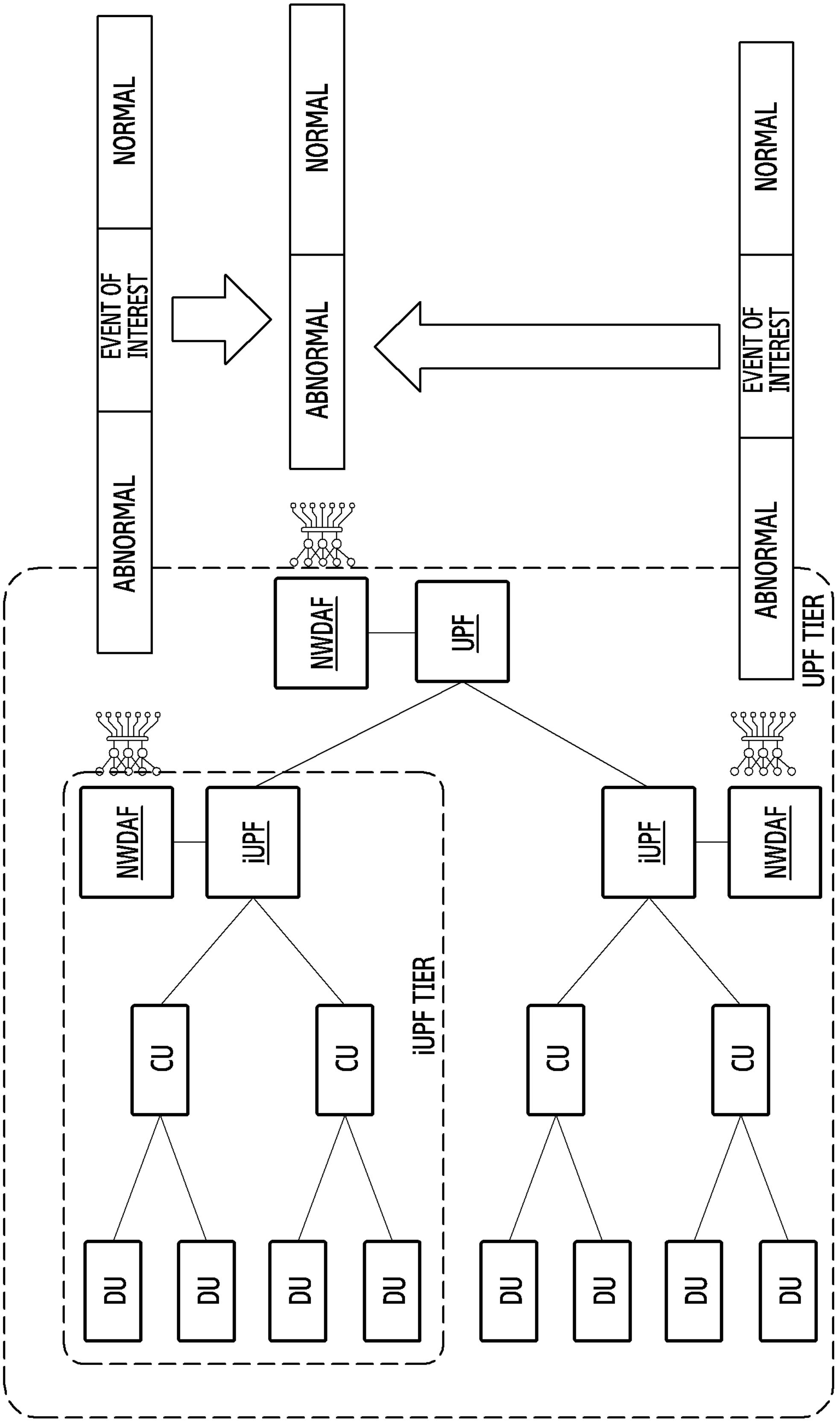
FIG. 4 illustrates a structure of a multi-tier AI/ML model according to an embodiment of the disclosure.

FIG. 4 illustrates a structure of a multi-tier AI/ML model according to an embodiment of the disclosure.

Referring to FIG. 4, various CN networks may have AI/ML models with the same input data, and the AI/ML model may differ in performance due to a range difference of data collected. An NWDAF of an intermediate UPF (iUPF) tier may perform learning for the AI/ML model based on AI/ML data of a plurality of DUs and CUs including an iUPF on a packet transmission path. Hence, the NWDAF of the iUPF tier may reduce latency through narrow management, but may lower processing result accuracy. Meanwhile, the NWDAF of the UPF tier may perform learning for the AI/ML model based on AI/ML data of all of the DUs and the CUs managed by the UPF. Accordingly, the NWDAF of the UPF tier may increase the latency through broad management, but may increase the processing result accuracy. Thus, if a hybrid multi-tier AI/ML model including both the NWDAF of the iUPF tier and the NWDAF of the UPF tier is used, a hybrid NWDAF may achieve lower latency and higher processing result accuracy than the two schemes described above.

Figure 5:
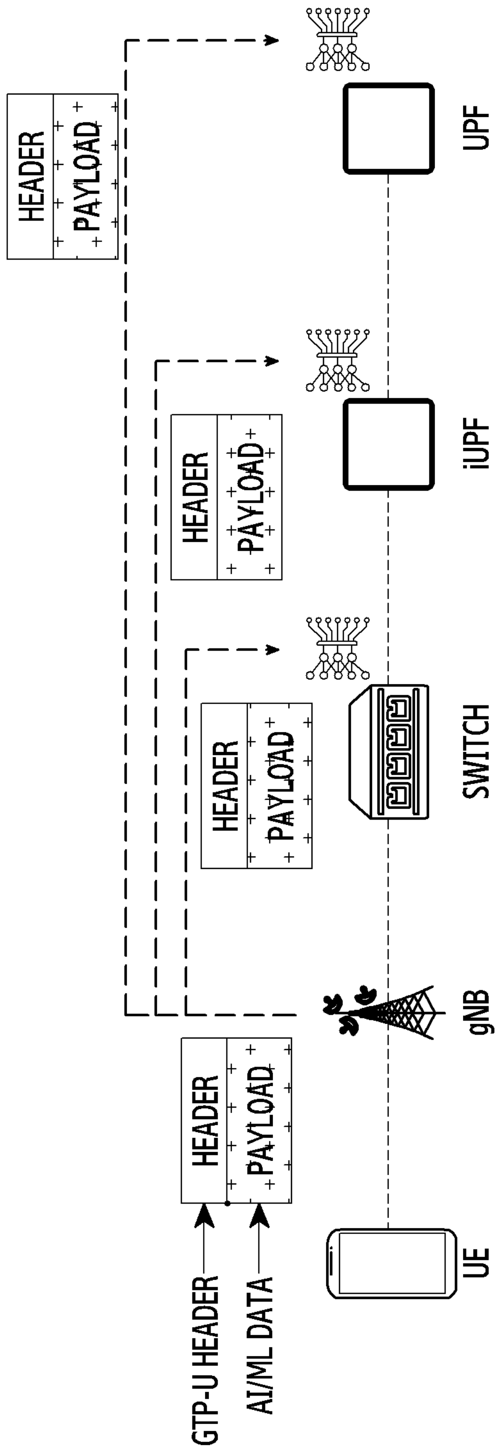
FIG. 5 illustrates AI/ML data transmission according to an embodiment of the disclosure.

FIG. 5 illustrates AI/ML data transmission according to an embodiment of the disclosure.

Referring to FIG. 5, a gNB transmits AI/ML data contained in a packet payload, to CN entities having an AI/ML model.

Each CN entity having the AI/ML model may have a different interface. Hence, if the gNB transmits the AI/ML data contained in the packet payload, other entity on a packet transmission path than an entity finally receiving the packet may not use the AI/ML data contained in the payload. If several entities use the AI/ML model using the same data of the same purpose, the gNB may need to redundantly transmit the same data for each interface of the CN entity of the AI/ML model.

The following embodiments may explain methods for reducing data size overhead compared to the above AI/ML data reporting method. In addition, methods for efficiently transmitting the AI/ML data to the multi-tier AI/ML model without AI/ML data redundant transmission shall be described.

Figure 6:
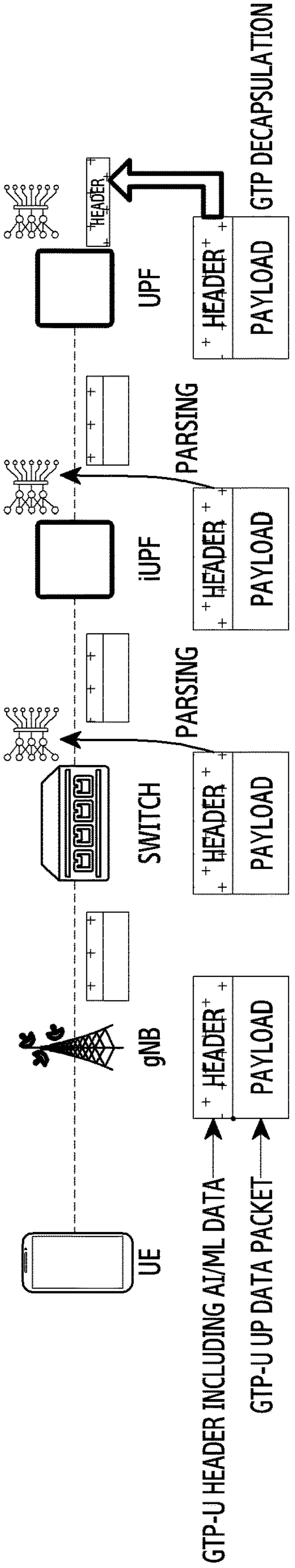
FIG. 6 illustrates an AI/ML data transmission method according to an embodiment of the disclosure.

FIG. 6 illustrates an AI/ML data transmission method according to an embodiment of the disclosure.

Referring to FIG. 6, a gNB may transmit AI/ML data (hereafter, referred to as AI related data or ML related data to ease the understanding. Alternatively, "data" may indicate hereafter the above AI/ML data, AI related data, or ML related data) contained in a packet header to entities having an AI/ML model.

The gNB may insert the AI/ML data into a data packet header (e.g., a general packet radio service tunneling protocol (GTP)-user plane (U) header), which may be conducted based on a preset AI data header information table. CN entities on a data packet transmission path may obtain the AI/ML data using a header parsing method. According to an embodiment, since the AI/ML data is inserted into the header, rather than the packet payload as described in FIG. 5, the data size overhead may be lowered and inefficiency in the data redundant transmission may be improved.

Figure 7:
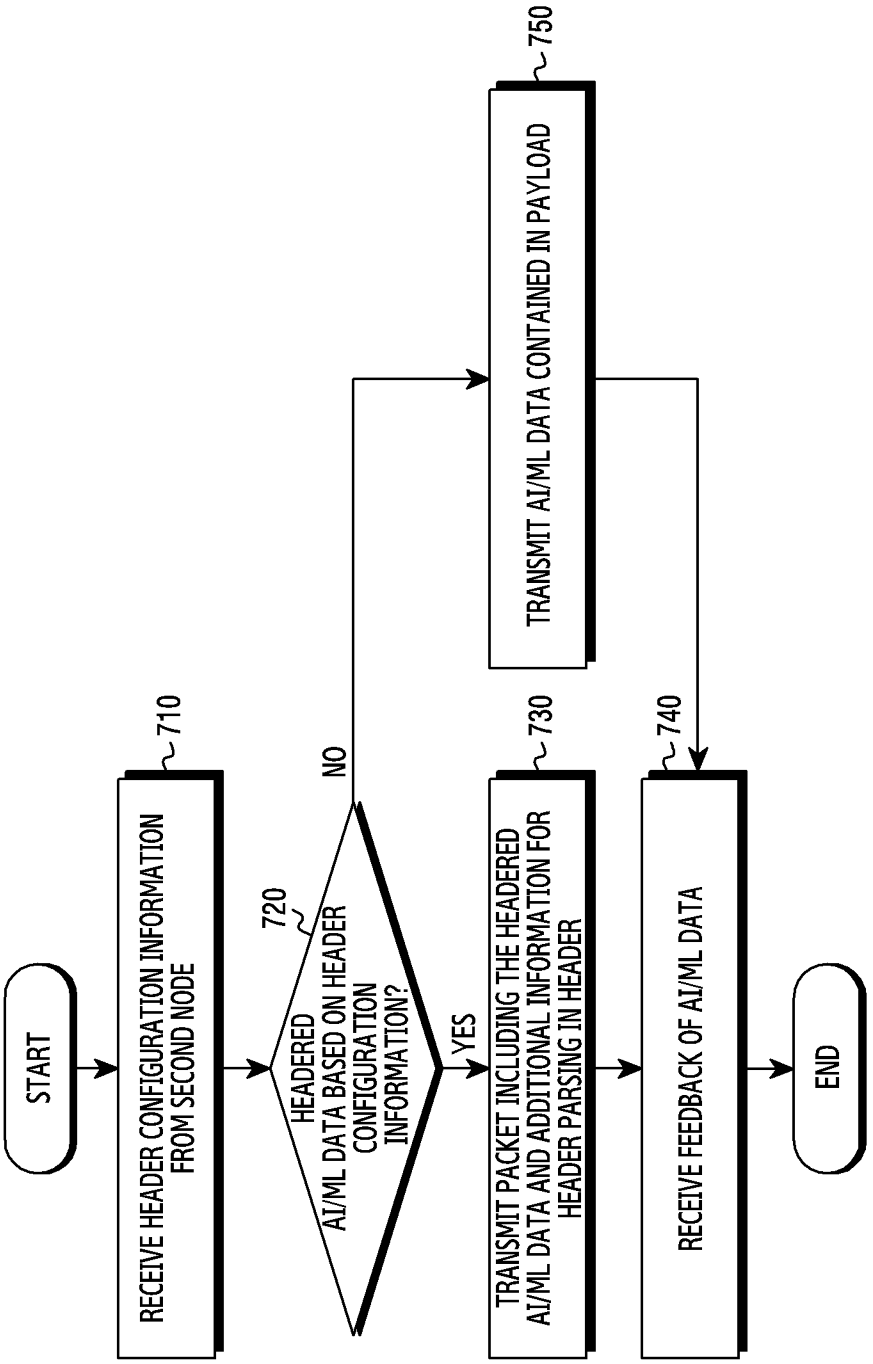
FIG. 7 illustrates an AI/ML data transmission method according to an embodiment of the disclosure.

A specific method for inserting the AI/ML data into the data packet header using the AI data header information table shall be described in FIG. 7.

FIG. 7 illustrates an AI/ML data transmission method according to an embodiment of the disclosure.

Referring to FIG. 7, a base station may transmit AI/ML data contained in a packet header to CN entities having an AI/ML model based on header configuration information.

In operation 710, the base station may receive the header configuration information from a second node. For example, the second node may be any one of a switch, an iUPF or a UPF having the multi-tier AI/ML model. The header configuration information may include various information for identifying (or, detecting, classifying) the AI/ML data to be transmitted by the base station in the packet header. For example, the various information contained in the header configuration information may include one or more of a name, an identification (ID), a header format, a protocol in the header, a size and a type of the AI/ML data to be contained in the header. The header configuration information may further include additional information (e.g., scrambling information) for encrypting and decrypting the AI/ML data to be contained in the header. In addition, the header configuration information may include a criterion for determining whether to insert the AI/ML data into the AI data header information table or a criterion for determining whether to transmit the AI/ML data in either the packet header or the payload.

In operation 720, the base station may determine whether to include the AI/ML data into the packet header using the AI data header information table based on the header configuration information received from the second node. For example, the base station may insert the AI/ML data into the AI data header information table, only if the AI/ML data size falls below a specific threshold. Alternatively, only if the AI/ML data type is represented with bits and data loss falls below a specific threshold, the base station may insert the AI/ML data into the AI data header information table. Hereafter, headering the AI/ML data may indicate converting the AI/ML data from the plain text to bits using the AI data header information table, to insert the AI/ML data into the packet header, and including the AI data header information table into the packet header. That is, headering the AI/ML data may indicate inserting the AI/ML data into the packet header using the AI data header information table.

In operation 730, if the header configuration information indicates to header the AI/ML data, the base station may header the AI/ML data using the AI data header information table. The base station may transmit to the second node, additional information for the header parsing together with the headered AI/ML data contained in the packet. The additional information for the header parsing and the headered AI/ML data may be contained in the packet header. The additional information for header-parsing the AI/ML data shall be described in FIG. 13.

In operation 740, the base station may receive a response to the AI/ML data transmission from the second node. The response of the second node to the AI/ML data transmission may be information (e.g., acknowledgement (ACK) or negative ACK (NACK)) of whether the AI/ML data is normally received. The second node, if receiving a NACK signal, may transmit the AI/ML data to the base station which transmits the NACK signal. The AI/ML data transmitted in response to the NACK signal reception may have a different redundancy version (RV) value from the AI/ML data previously transmitted. Alternatively, the response to the AI/ML data transmission may be feedback including network management information optimized by the AI/ML model included in the second node through the AI/ML data.

In operation 750, if the header configuration information indicates no AI/ML data headering, that is, if the AI/ML data is not contained in the header, the base station may transmit the AI/ML data contained in the packet payload to the second node. Hence, the AI/ML data contained in the payload may be transmitted in the form of the plain text, to the second node according to the AI/ML data transmission method of FIG. 5. Alternatively, the base station may transmit the AI/ML data contained in the packet payload using the AI data header information table, which shall be elucidated in FIG. 9.

Figure 8:
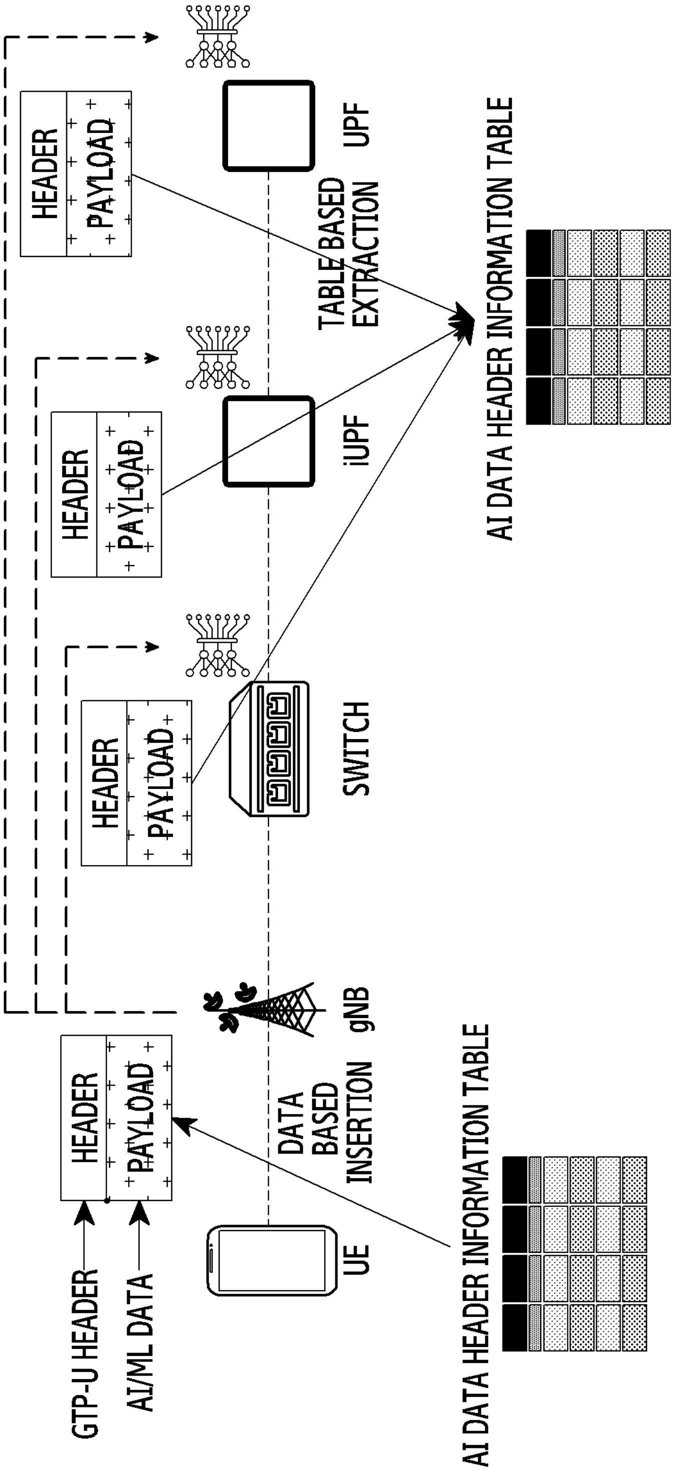
FIG. 8 illustrates AI/ML data transmission according to an embodiment of the disclosure.

FIG. 8 illustrates AI/ML data transmission according to an embodiment of the disclosure.

Referring to FIG. 8, a gNB may transmit AI/ML data contained in a payload to CN entities having an AI/ML model based on an AI data header information table.

The gNB may insert the AI/ML data into the packet payload using the AI data header information table. CN entities on a packet transmission path may obtain the AI/ML data included in the payload. In this case, since the AI/ML data included in the payload is inserted into the AI data header information table, the AI/ML data may be transmitted in the form of bits. Hence, necessary traffic for the gNB to transmit the same information to the CN entities on the data packet transmission path may be reduced. However, the AI/ML data contained in the AI data header information table may include the same information, but the range of the AI/ML data obtainable by the CN entities of the packet transmission path through the header parsing may differ.

FIG. 9 illustrates an AI/ML data transmission method according to an embodiment of the disclosure.

Referring to FIG. 9, a base station may transmit AI/ML data contained in a packet payload to CN entities having an AI/ML model based on an AI data header information table.

In operation 910, the base station may receive header configuration information from a second node. For example, the second node may be any one of, but not limited to, a switch, an iUPF or a UPF having the multi-tier AI/ML model. The header configuration information may include various information for identifying (or, detecting, classifying) the AI/ML data to be transmitted by the base station in the packet header. For example, the various information contained in the header configuration information may include one or more of the name, the ID, the header format, the protocol in the header, the size and the type of the AI/ML data to be contained in the header. The header configuration information may further include additional information (e.g., scrambling information) for encrypting and decrypting the AI/ML data to be contained in the header. The various information contained in the header configuration information may include the information for determining whether to transmit the AI/ML data to the second node using the AI data header information table or the information for determining whether to include the AI data header information table in the packet header. Hence, the base station may insert the AI/ML data into the AI data header information table based on the header configuration information, and transmit the AI data header information table contained in the packet payload to the second node.

In operation 920, the base station may transmit the AI/ML data contained in the packet payload to the second node based on the header configuration information received from the second node. For example, if the AI/ML data to transmit the second node is not in size or type to be contained in the header, the base station may transmit the AI/ML data contained in the packet payload to the second node. Operation 920 may be performed according to operations 720 and 750 of FIG. 7.

In operation 930, if transmitting the AI/ML data contained in the packet payload to the second node, the base station may determine whether to transmit the AI/ML data to the second node using the AI data header information table based on the header configuration information. For example, the base station may insert the AI/ML data into the AI data header information table, only if the AI/ML data size falls below a specific threshold. Alternatively, only if the AI/ML data type is represented with bits and the data loss falls below a specific threshold, the base station may insert the AI/ML data into the AI data header information table.

If determining whether to transmit the AI/ML data to the second node using the AI data header information table based on the header configuration information, the base station may convert the AI/ML data into the bits in operation 940. The base station may insert the AI/ML data converted into the bits, into the AI data header information table. In addition, the base station may insert additional information for the second node receiving the packet to obtain the AI/ML data, into the AI data header information table. The additional information for the second node to obtain the AI/ML data shall be described in FIG. 13.

In operation 950, the base station may receive a response to the AI/ML data transmission from the second node. The response of the second node to the AI/ML data transmission may be information (e.g., ACK or NACK) of whether the AI/ML data is normally received. The second node, if receiving a NACK signal, may transmit the AI/ML data to the base station which transmits the NACK signal. The AI/ML data transmitted in response to the NACK signal reception may have a different RV value from the AI/ML data previously transmitted. Alternatively, the response to the AI/ML data transmission may be the feedback including the network management information optimized by the AI/ML model included in the second node through the AI/ML data.

In operation 960, if determining not to use the AI data header information table based on the header configuration information, that is, if determining to transmit the AI/ML data in the form of the plain text, the base station may transmit the AI/ML data contained in the packet payload in the form of the plain text.

Figure 10:
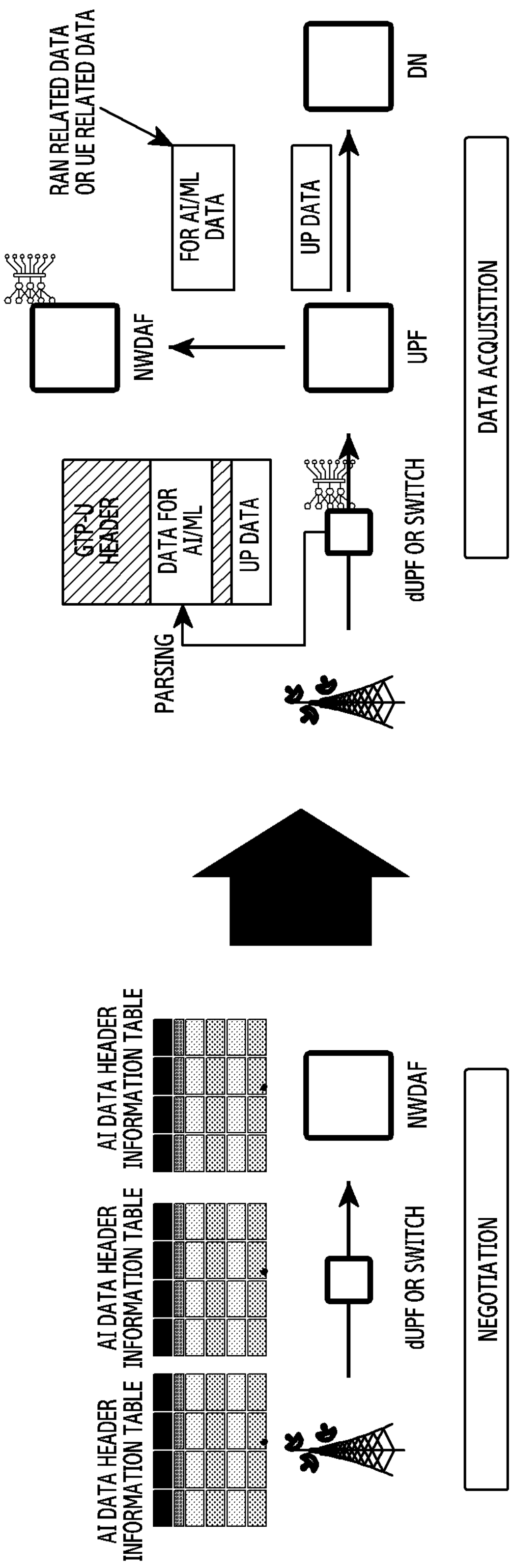
FIG. 10 illustrates AI/ML data transmission according to an embodiment of the disclosure.

FIG. 10 illustrates AI/ML data transmission according to an embodiment of the disclosure.

Referring to FIG. 10, a detailed procedure in which a gNB inserts AI/ML data into an AI data header information table, includes the AI data header information table into a packet header and transmits it to CN entities and an NWDAF shall be described.

The gNB and the CN entities may share header configuration information for headering existing AI/ML data based on the plain text. That is, the header configuration information may be preconfigured in the gNB and the CN entities. One or more information of the name, the ID, the header format, the protocol in the header, the size and the type of the AI/ML data may be preconfigured in the gNB and the CN entities according to the header configuration information. Also, the header configuration information may configure the additional information (e.g., scrambling information) for encrypting and decrypting the AI/ML data to be contained in the header, for the gNB and the CN entities. In addition, the header configuration information may include the criterion for determining whether to insert the AI/ML data into the AI data header information table or the criterion for determining whether to transmit the AI/ML data in either the header or the payload of the packet.

However, the range of the AI/ML data to be contained in the packet header may be determined by the header configuration information between the gNB and the CN entities having the AI/ML model, and this process may be referred to as compromise (or negotiation) based on the header configuration information between the CN entities. In addition, the AI/ML models of the CN entities may determine the range of the AI/ML data obtainable based on the header configuration information. For example, the AI/ML data range required by each AI/ML model may differ depending on the AI/ML data type information contained in the header configuration information.

In an embodiment, the gNB may include RAN related AI/ML data into a UP data packet header (e.g., a GTP-U header) between the RAN and the UPF regardless of a source UE (e.g., a UE transmitting specific AI/ML data) based on header configuration information received from the NWDAF. Meanwhile, the gNB may include UE related AI/ML data into a UP data packet header of the UE based on the header configuration information received from the NWDAF. The gNB may transmit a packet including the AI/ML data in the header, to a distributed UPF (dUPF), the switch or the NWDAF. The dUPF or the switch may acquire the AI/ML data contained in the GTP-U header received from the gNB, through the header parsing based on the header configuration information. That is, the GTP-U may be decapsulated. The GTP-U decapsulation may indicate transmitting the GTP-U from the gNB to a higher layer (e.g., the switch, the dUPF or the UPF). The UPF may transmit the information (e.g., the header portion including the AI/ML data) contained in the header part of the decapsulated packet to the NWDAF, and transmit the UP data contained in the packet payload to a data network (DN). The NWDAF may obtain the AI/ML data from the information contained in the header part received from the UPF.

Figure 11:
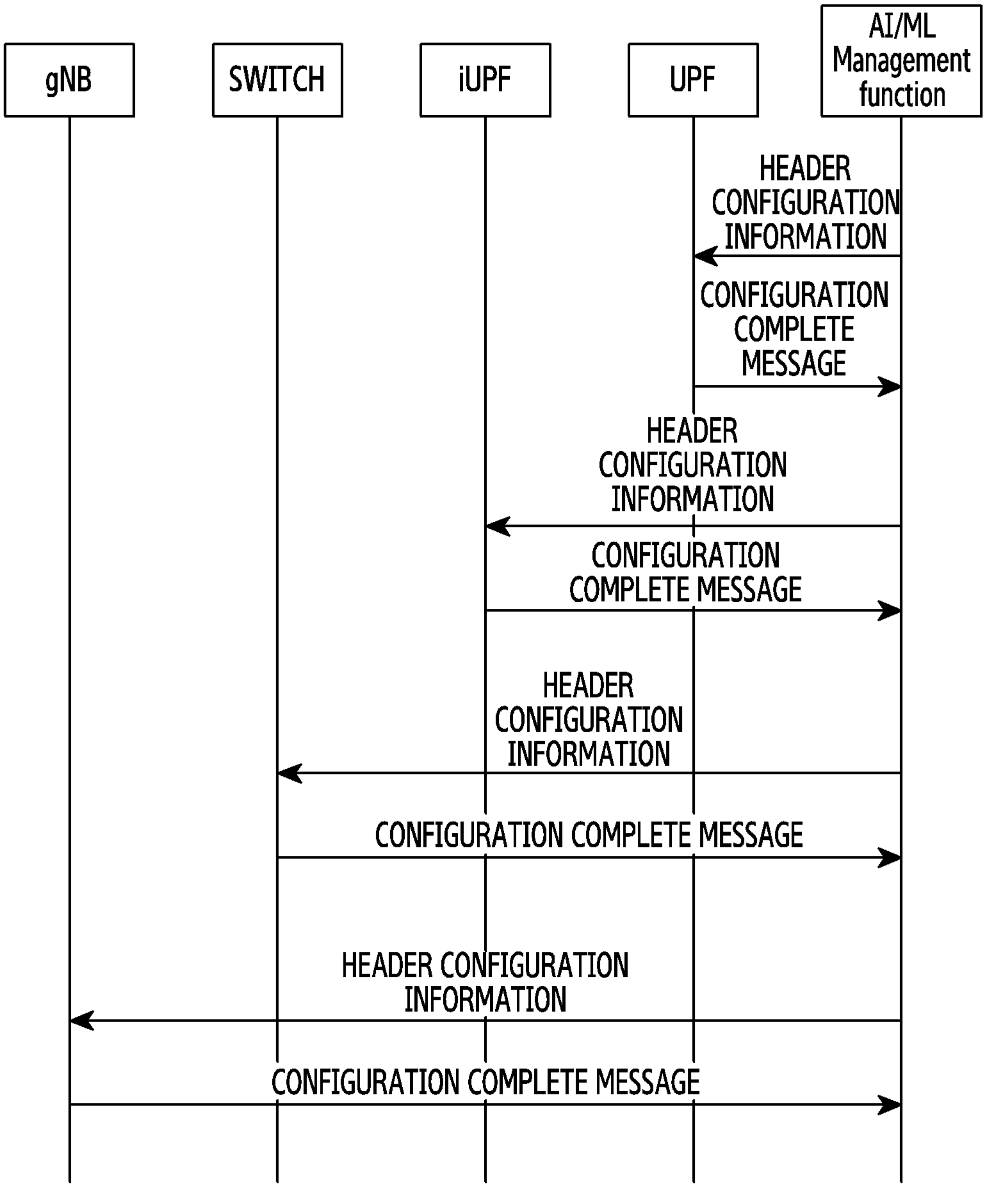
FIG. 11 illustrates a method for managing an AI/ML data header information table according to an embodiment of the disclosure.

FIG. 11 illustrates a method for managing an AI/ML data header information table according to an embodiment of the disclosure.

Referring to FIG. 11, the CN may provide an AI/ML management function. The AI/ML management function may preconfigure the header configuration information in the gNB and the CN entity. Alternatively, the AI/ML management function may preconfigure the AI data header information table in the gNB and the CN entity.

More specifically, the AI/ML management function may transmit the header configuration information (or the AI data header information table) to the gNB and the CN entity (e.g., the switch, the iUPF, or the UPF). In response to transmitting the header configuration information (or the AI data header information table), the gNB and the CN entity receiving the header configuration information may transmit a configuration complete message to the AI/ML management function. For example, the response to the header configuration information (or the AI data header information table) transmission may be an ACK or NACK signal including information of whether the header configuration information is normally received.

Figure 12:
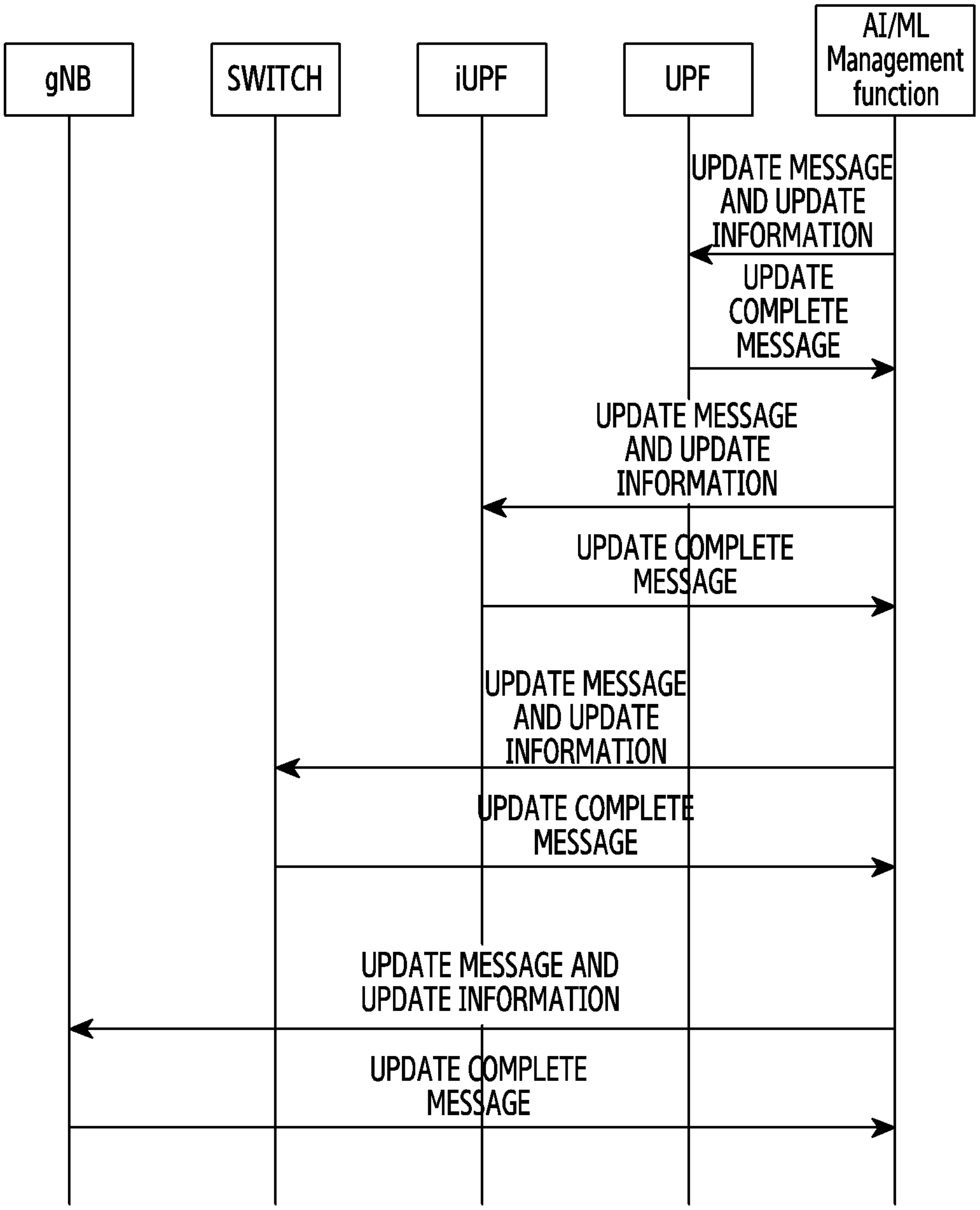
FIG. 12 illustrates a method for managing an AI/ML data header information table according to an embodiment of the disclosure.

FIG. 12 illustrates a method for managing an AI/ML data header information table according to an embodiment of the disclosure.

Referring to FIG. 12, transmitting and receiving update information of FIG. 12 may be understood as a process in which the AI/ML management function updates the header configuration information (or the AI data header information table) based on information inserted by the gNB into the header while AI/ML models operate according to the header configuration information (or the AI data header information table) as explained in FIG. 11.

In an embodiment, if the gNB needs to change the criterion for determine whether to header the AI/ML data according to a communication environment change, the AI/ML management function may trigger the header configuration information (or the AI data header information table) update based on the information contained in the packet header received from the gNB. For example, triggering the header configuration information (or the AI data header information table) may transmit an update message or update information to the gNB and the CN entities. The AI/ML management function may directly transmit the update information to the gNB and the CN entities. Alternatively, the AI/ML management function may preconfigure to change the header configuration information to a different setting value from a current setting value in the gNB and the CN entities, and transmit only the update message including information indicating to change the setting value.

The gNB may transmit a response (e.g., ACK or NACK) to the update message or the update information with the AI/ML management function. If receiving a NACK signal, the AI/ML management function may transmit an update message or update information to the gNB and the CN entities transmitting the NACK signal. However, the update message or the update information transmitted in response to receiving the NACK signal may have a different RV value from the previous update message or update information transmitted. The gNB may perform operations of FIG. 7 or 9 based on the update message or the update information received from the AI/ML management function.

Figure 13:
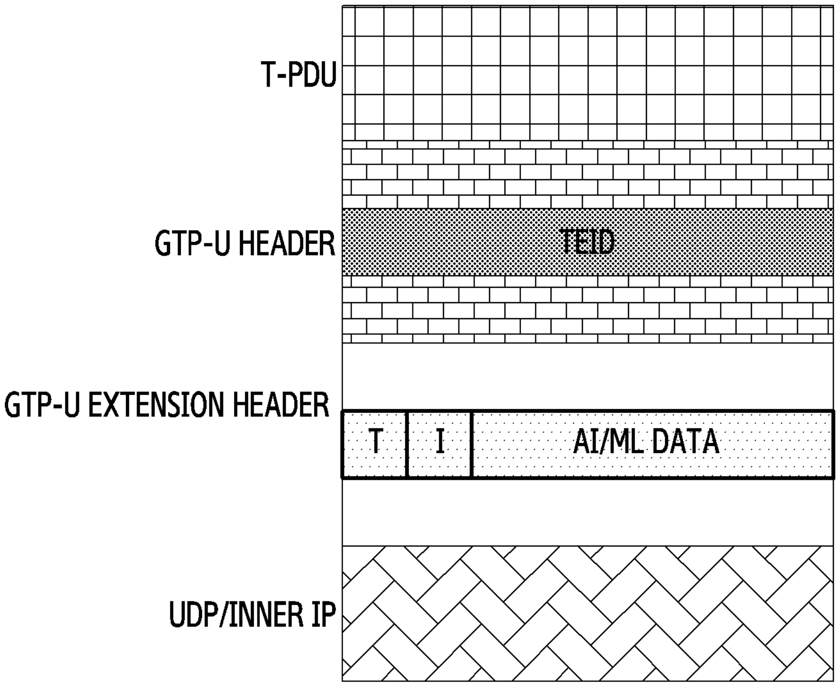
FIG. 13 illustrates a structure of a general packet radio service tunneling protocol (GTP)-user plane (U) header according to an embodiment of the disclosure.

FIG. 13 illustrates a structure of a GTP-U header according to an embodiment of the disclosure.

Referring to FIG. 13, for the gNB to transmit AI/ML data contained in the packet header to CN entities, the GTP-U header may further include a GTP-U extension header.

The AI/ML data may be included in the existing protocol of the GTP-U header or the GTP-U extension header. If the AI/ML data is included in the GTP-U extension header, the GTP-U extension header may contain the AI/ML data and may further include the additional information for header-parsing the AI/ML data. The additional information for header-parsing the AI/ML data may include an AI/ML data classifier or an AI/ML data identifier. For example, the AI/ML data classifier may be information for classifying RAN related AI/ML data and UE related AI/ML data. Header information used by the AI/ML model may differ depending on AI/ML data classifier information. The AI/ML data classifier information may be expressed with a T bit (e.g., T is 0 or 1). The AI/ML data classifier may be information for classifying the type of the AI/ML data. The AI/ML data classifier may be expressed with an I bit. Hereafter, the T bit and the I bit are described as 1 bit by way of example in the embodiment of FIG. 14, but may be expressed as two or more bit values. The additional information for the header parsing may include the same information as the additional information for the second node to acquire the AI/ML data as described in FIGS. 7 and 9.

Figure 14:
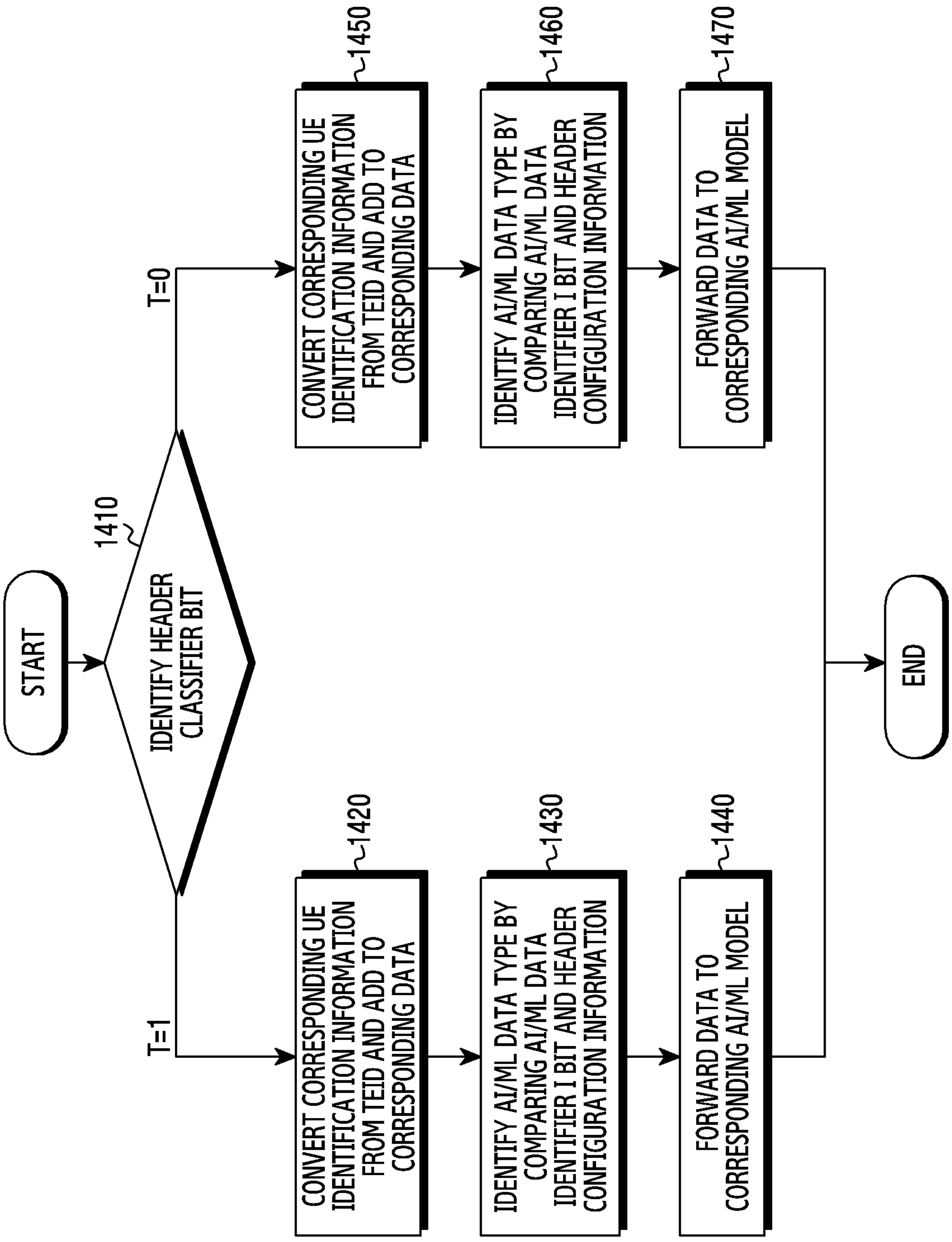
FIG. 14 illustrates a method for obtaining AI/ML data of an AI/ML model according to an embodiment of the disclosure.

FIG. 14 illustrates a method for obtaining AI/ML data of an AI/ML model according to an embodiment of the disclosure.

Referring to FIG. 14, each CN entity receiving a packet including AI/ML data in a header from the gNB may forward the AI/ML data to the AI/ML model of each CN entity based on the AI/ML data classifier or the AI/ML data identifier contained in the header.

In operation 1410, each CN entity may identify the AI/ML data classifier bit T contained in the packet header received from the gNB.

In operation 1420, if T indicates a first value (e.g., 1), each CN entity may convert corresponding UE identification information (e.g., UE internet protocol (IP) address) from a tunnel endpoint identifier (TEID) and add it to the AI/ML data. For example, the first value may indicate that the AI/ML data is UE related AI/ML data.

In operation 1430, each CN entity may identify the type of the AI/ML data by comparing the AI/ML data identifier I bit with the header configuration information. For example, the AI/ML data type may include one of, but not limited to, the QoS guarantee/improvement, the traffic control, the mobility management, or the load balancing.

In operation 1440, each CN entity may forward the AI/ML data to a corresponding AI/ML model.

In operation 1450, if T indicates a second value (e.g., 0) different from the first value, each CN entity may convert corresponding gNB identification information (e.g., gNB IP address) from the TEID and add it to the AI/ML data. For example, the second value may indicate that the AI/ML data is RAN related AI/ML data.

In operation 1460, each CN entity may identify the type of the AI/ML data by comparing the AI/ML data identifier I bit with the header configuration information. For example, the AI/ML data type may include one of, but not limited to, the QoS guarantee/improvement, the traffic control, the mobility management, or the load balancing.

In operation 1470, each CN entity may forward the AI/ML data to a corresponding AI/ML model.

FIG. 15 illustrates a GTP-U header format structure according to an embodiment of the disclosure.

Referring to FIG. 15, an embodiment of the GTP-U header format may be explained if the gNB transmits AI/ML data contained in the GTP-U header. 0th through 11th octets may be the same as the existing GTP-U header format. 12th and 13th octets may include extension header information (e.g., next extension header type and extension header length). A 14th octet may include the AI/ML data classifier and the AI/ML data according to the embodiment mentioned above. At this time, the AI/ML data identifier may not be included. The headered AI/ML data aforementioned may be also included in a 15th octet after the AI/ML data classifier of the 14th octet, and the number of the octets or the bits containing the AI/ML data may differ depending on the AI/ML data size.

FIG. 16 illustrates a GTP-U header format structure according to an embodiment of the disclosure.

Referring to FIG. 16, an embodiment of the GTP-U header format may be explained if the gNB transmits AI/ML data contained in the GTP-U header. 0th through 11th octets may be the same as the existing GTP-U header format. 12th and 13th octets may include extension header information (e.g., next extension header type and extension header length). A 14th octet may include the AI/ML data classifier and the AI/ML data identifier according to the embodiment mentioned above. The headered AI/ML data aforementioned may be also included in a 15th octet, and the number of the octets or the bits containing the AI/ML data may differ depending on the AI/ML data size.

Figure 17:
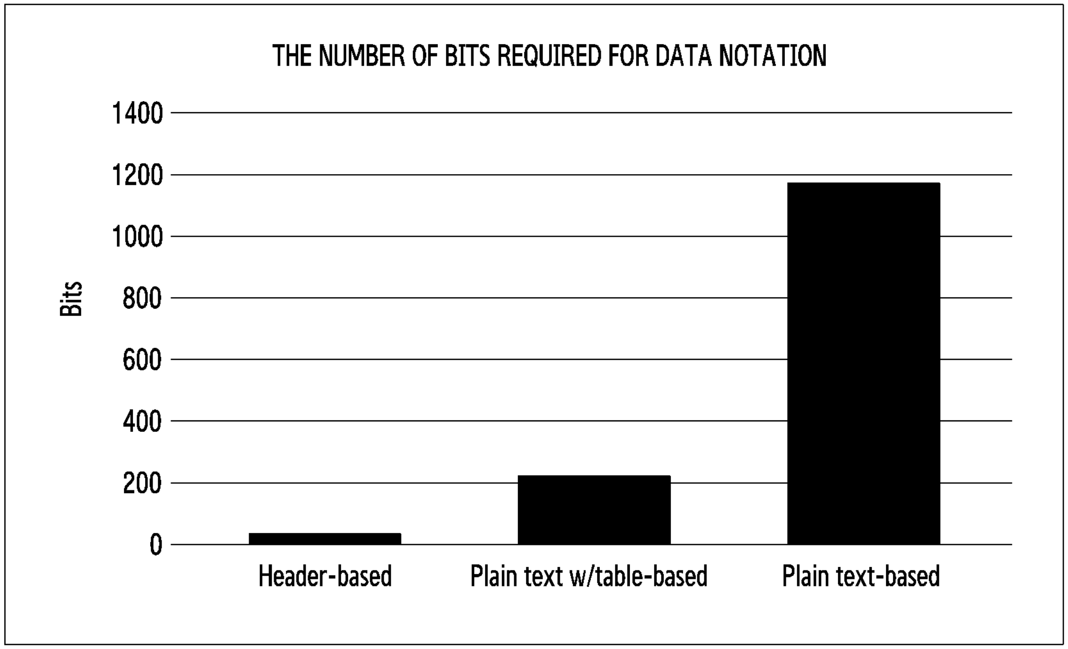
FIG. 17 illustrates AI/ML data transmission results according to an embodiment of the disclosure.

FIG. 17 illustrates AI/ML data transmission results according to an embodiment of the disclosure.

Referring to FIG. 17, a difference of necessary resources (e.g., the number of bits required for data notation) may be explained based on the AI/ML data transmission method of the gNB. For example, the AI/ML data transmission method to each CN entity of the gNB may include the transmission method in the form of the existing plain text through the packet payload, the transmission method in the form of the existing plain text and the AI data header information table through the packet payload, the transmission method in the form of the AI data header information table through the packet header, and so on. However, the AI/ML data transmission method is not limited to those methods. The number of the bits required for the AI/ML data transmission may differ in the AI/ML data transmission methods including the embodiments of the AI/ML data transmission method. That is, the transmission method in the form of the AI data header information table through the packet header may reduce the necessary resources for the AI/ML data transmission, compared to the AI/ML data transmission method in the form of the plain text through the packet payload.

Figure 18:
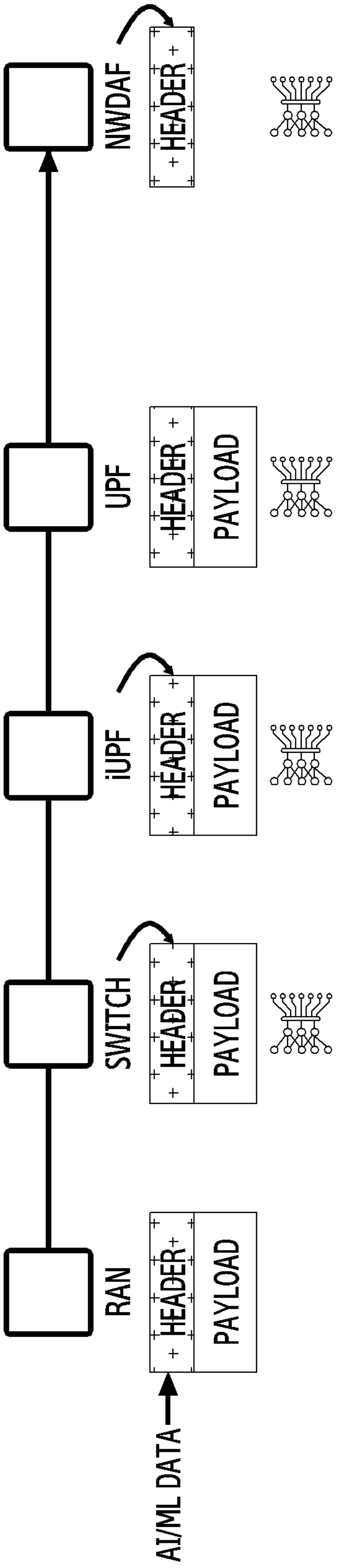
FIG. 18 illustrates an AI/ML data acquisition method according to an embodiment of the disclosure.

FIG. 18 illustrates an AI/ML data acquisition method according to an embodiment of the disclosure.

Referring to FIG. 18, AI/ML models in a UP packet transmission path may obtain AI/ML data from one packet received from the gNB. Hence, the gNB may not redundantly report the AI/ML data for each AI/ML model. That is, all of the AI/ML models between the RAN and the NWDAF may access the AI/ML data through the header parsing, and may obtain the AI/ML data without changing or managing the interface even if the UP packet transmission path is changed.

Figure 19:
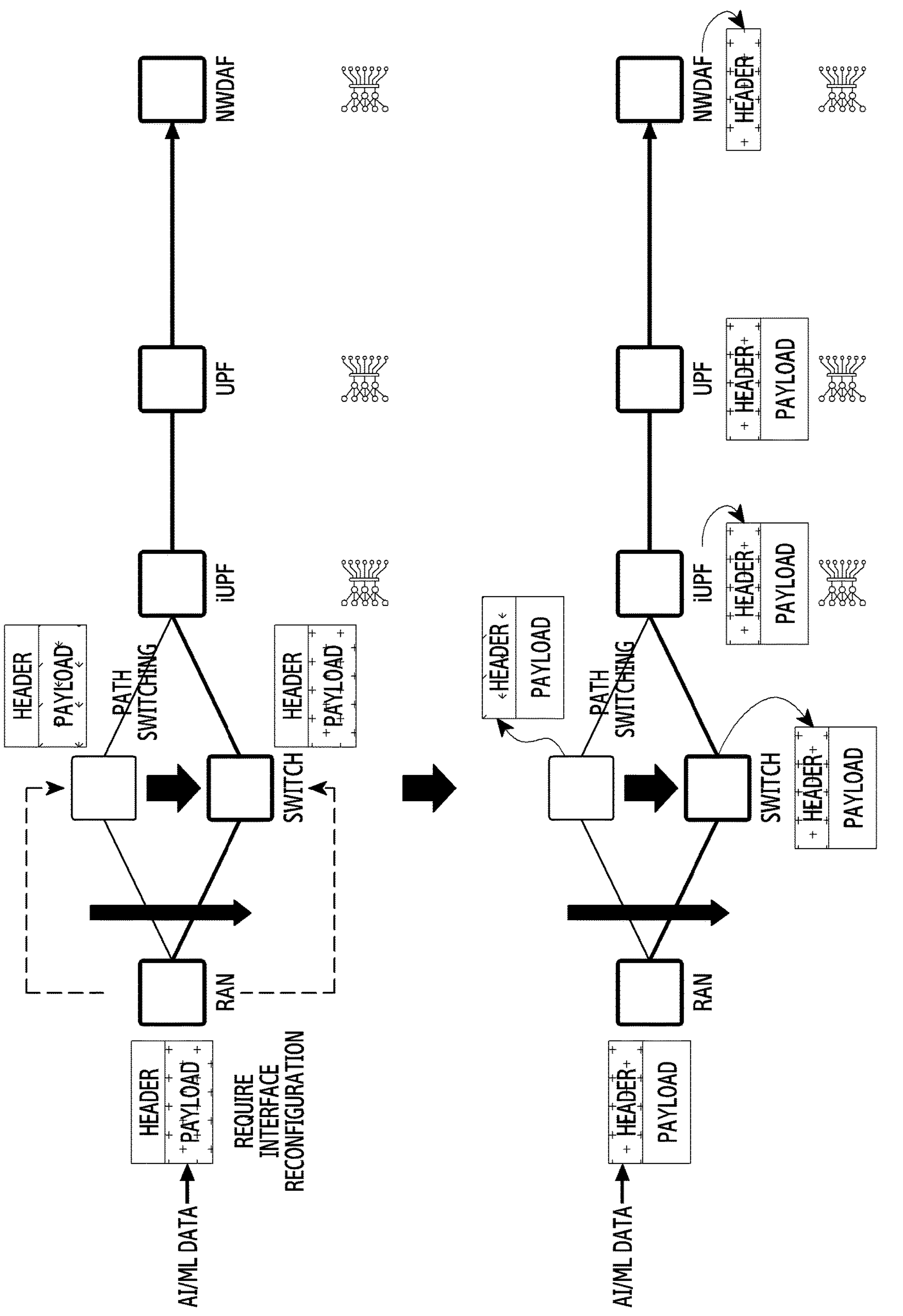
FIG. 19 illustrates a method for reconfiguring a UP packet transmission path according to an embodiment of the disclosure.

FIG. 19 illustrates a method for reconfiguring a UP packet transmission path according to an embodiment of the disclosure.

Referring to FIG. 19, if AI/ML data contained in a UP packet payload is transmitted and the switch on a transmission path changes, the gNB may need to change an interface for reporting the AI/ML data. However, the packet header may use the same header, without changing the interface for each entity receiving the packet. Hence, if the AI/ML data contained in the UP packet header is transmitted and the switch on the transmission path changes, the gNB may not change the interface for reporting the AI/ML data.

Figure 20:
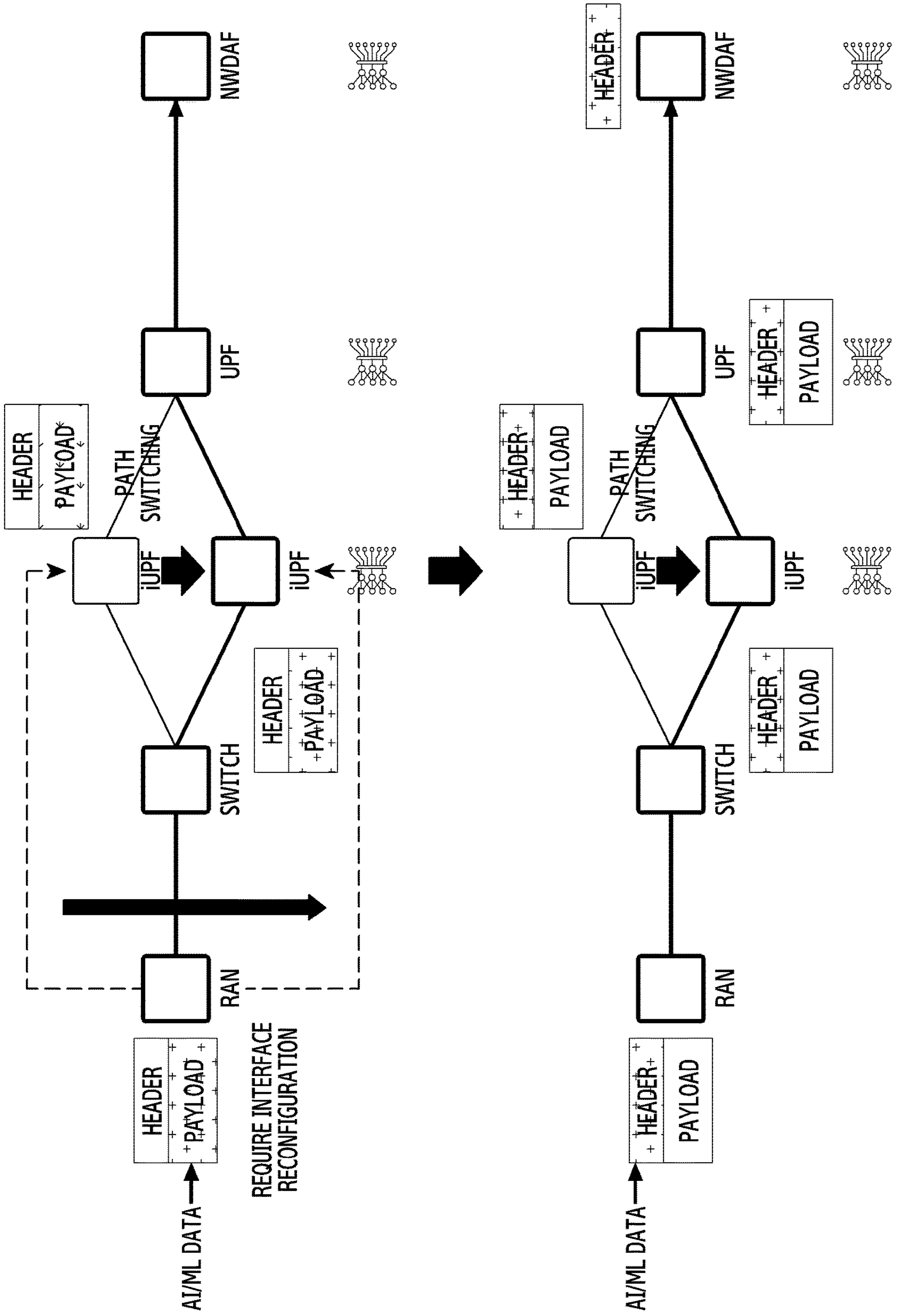
FIG. 20 illustrates UP packet transmission path reconfiguration according to an embodiment of the disclosure.

FIG. 20 illustrates UP packet transmission path reconfiguration according to an embodiment of the disclosure.

Referring to FIG. 20, if AI/ML data contained in a UP packet payload is transmitted and the iUPF on a transmission path is changed, the gNB may need to change an interface for reporting the AI/ML data. However, the packet header may use the same header, without changing the interface for each entity receiving the packet. Hence, if the AI/ML data contained in the UP packet header is transmitted and the iUPF on the transmission path is changed, the gNB may not change the interface for reporting the AI/ML data.

Figure 21:
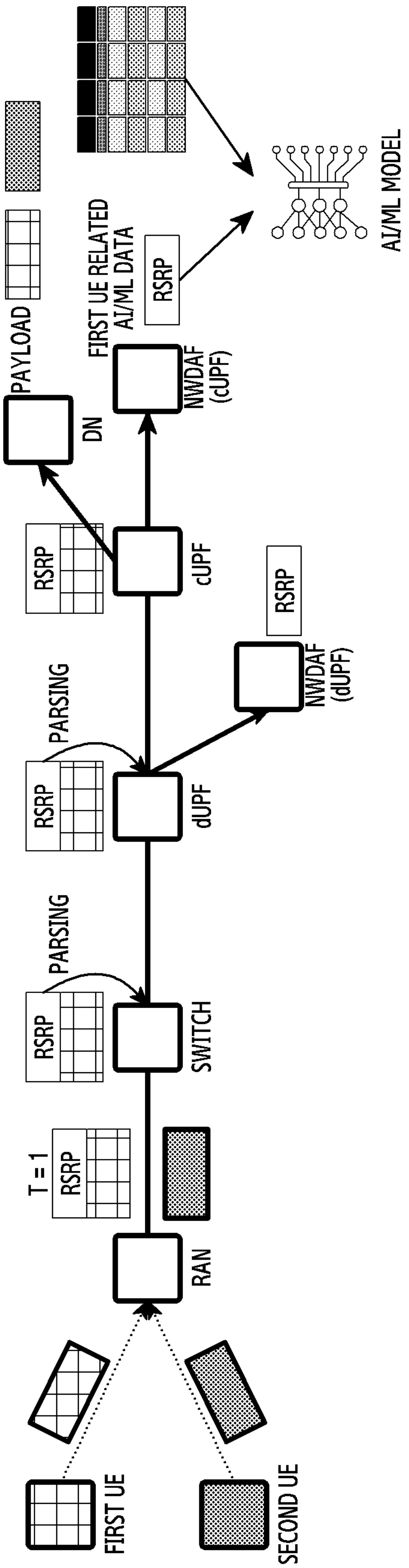
FIG. 21 illustrates a method for transmitting user equipment (UE) related AI/ML data according to an embodiment of the disclosure.

FIG. 21 illustrates a method for transmitting UE related AI/ML data according to an embodiment of the disclosure.

Referring to FIG. 21, the gNB may transmit first data (e.g., UE related AI/ML data) contained in a UP packet header. For example, first UE related AI/ML data may be a reference signal received power (RSRP) measured by a first UE. Since the communication environment of each UE may vary, the RSRP received from the gNB may have a different value in each UE. Hence, the RSRP of the first UE may have a different value from the RSRP of a second UE. AI/ML models in the UP packet transmission path may obtain the first UE related AI/ML data contained in the UP packet header through the header parsing.

Meanwhile, the gNB may transmit second data (e.g., other data than the UE related AI/ML data) contained in the packet payload. For example, the second data may include information to be transmitted by a first UE and a second UE to the gNB and the CN to perform the communication based on FIG. 22. The UPF (e.g., the cUPF) may forward the second data contained in the UP packet payload to the DN.

Figure 22:
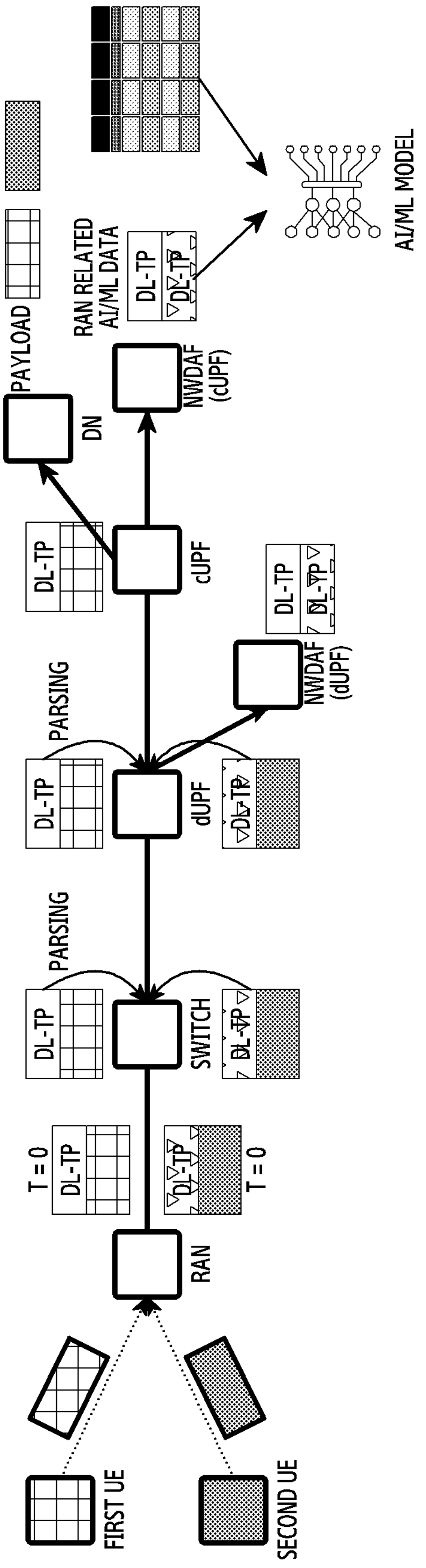
FIG. 22 illustrates a method for transmitting random access network (RAN) related AI/ML data according to an embodiment of the disclosure.

FIG. 22 illustrates a method for transmitting RAN related AI/ML data according to an embodiment of the disclosure.

Referring to FIG. 22, the gNB may transmit third data (e.g., RAN related data) contained in a GTP-U tunneling packet header. For example, the RAN related AI/ML data may be a cell downlink average throughput (DL-TP), and the DL-TP may be a measurement value irrelevant to the UE. Accordingly, AI/ML models in the UP packet transmission path may obtain the third data contained in the GTP-U tunneling packet header through the header parsing.

Meanwhile, the gNB may transmit fourth data (e.g., other data than UE related AI/ML data) contained in the GTP-U tunneling packet payload. The fourth data may include information to be transmitted by a first UE and a second UE to the gNB and the CN to perform the communication based on FIG. 22, and may include the same information as the second data of FIG. 21. The UPF (e.g., the cUPF) may forward the fourth data contained in the GTP-U tunneling packet payload to the DN.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the specific embodiments of the disclosure, the components included in the disclosure are expressed in a singular or plural form. However, the singular or plural expression is appropriately selected according to a proposed situation for the convenience of explanation, the disclosure is not limited to a single component or a plurality of components, the components expressed in the plural form may be configured as a single component, and the components expressed in the singular form may be configured as a plurality of components.

Meanwhile, the embodiments of the disclosure shown in the specification and the drawings present merely specific examples to easily explain the technical contents of the disclosure and help understanding of the disclosure, and are not intended to limit the scope of the disclosure. That is, it will be apparent to those skilled in the art that other variants based on the technical idea of the disclosure may be implemented. Also, the above respective embodiments may be employed in combination, as necessary. For example, one embodiment of the disclosure may be partially combined with another embodiment to operate the base station and the terminal. For example, the first and embodiment and the second embodiment of the disclosure may be partially combined to operate the base station and the terminal. In addition, although the above embodiments have been described by way of a frequency division duplex (FDD) LTE system, other variants based on the technical idea of the embodiments may be implemented in other systems such as time division duplex (TDD) LTE and 5G or NR systems.

Meanwhile, in the drawings for explaining the method of the disclosure, the order of description does not necessarily correspond to the execution order, and the precedence relationship may be changed or may be executed in parallel.

Alternatively, the drawings explaining the method of the disclosure may omit some component and include only some element therein without departing from the essential spirit and the scope of the disclosure.

Also, the embodiments of the disclosure may be fulfilled by combining some or all of the contents of each embodiment without departing from the essential spirit and the scope of the disclosure.

Meanwhile, various embodiments of the disclosure have been described. The above description of the disclosure is merely for the purpose of illustration, and is not intended to limit embodiments of the disclosure to the embodiments set forth herein. Those skilled in the art will appreciate that other specific modifications and changes may be easily made thereto without changing the technical idea or essential features of the disclosure. The scope of the disclosure should be determined not by the above description but by the appended claims, and all changes and modifications derived from the meaning and the scope of the claims and equivalent concepts thereof shall be construed as falling within the scope of the disclosure.

As set forth above, a method of operating a first node in a wireless communication system according to various embodiments of the disclosure may include receiving header configuration information from a second node, if header configuration information indicates to contain first data including one or more of network management information and user service provision information into a header, transmitting a packet including the first data and additional information for parsing the first data to the second node, and receiving a response to the first data from the second node which receives the packet, and the first data and the additional information may be contained in the header of the packet.

According to various embodiments of the disclosure, the method may further include determining whether to contain the first data in the header or a payload of the packet, based on the header configuration information, and the header configuration information may include identification information of the first data to determine a transmission position of the first data in the packet, and the identification information may include one or more of a name, an identification, a header format, a protocol in the header, a size and a type of the first data contained in the header.

According to various embodiments of the disclosure, the first data may be based on preconfigured header information table, and the header information table may include information representing the first data with bits.

According to various embodiments of the disclosure, the method may further include receiving update information of the header configuration information from the second node.

According to various embodiments of the disclosure, transmitting the packet to the second node may include, if the header configuration information indicates to contain the first data in a payload, transmitting the packet containing the first data to the second node.

As set forth above, a method of operating a second node in a wireless communication system according to various embodiments of the disclosure may include transmitting header configuration information to a first node, if header configuration information indicates to contain first data including one or more of network management information and user service provision information into a header, receiving a packet including the first data and additional information for parsing the first data from the first node, and transmitting a response to the first data to the first node.

According to various embodiments of the disclosure, the first data may be based on preconfigured header information table, and the header information table may include information representing the first data with bits.

According to various embodiments of the disclosure, the method may further include transmitting update information of the header configuration information to the first node.

According to various embodiments of the disclosure, receiving the packet from the first node may include, if the header configuration information indicates to contain the first data in a payload, receiving the packet including the first data from the first node.

According to various embodiments of the disclosure, the header configuration information may include identification information of the first data to determine a transmission position of the first data in the packet, and the identification information may include one or more of a name, an identification, a header format, a protocol in the header, a size and a type of the first data contained in the header.

As set forth above, an apparatus of a first node in a wireless communication system according to various embodiments of the disclosure may include a transceiver and a controller, the controller may be configured to receive header configuration information from a second node, if header configuration information indicates to contain first data including one or more of network management information and user service provision information into a header, transmit a packet including the first data and additional information for parsing the first data to the second node, and receive a response to the first data from the second node which receives the packet, and the first data and the additional information may be contained in the header of the packet.

According to various embodiments of the disclosure, the controller may determine whether to contain the first data in the header or a payload of the packet, based on the header configuration information, the header configuration information may include identification information of the first data to determine a transmission position of the first data in the packet, and the identification information may include one or more of a name, an identification, a header format, a protocol in the header, a size and a type of the first data contained in the header.

According to various embodiments of the disclosure, the first data may be based on preconfigured header information table, and the header information table may include information representing the first data with bits.

According to various embodiments of the disclosure, the controller may receive update information of the header configuration information from the second node.

According to various embodiments of the disclosure, if the header configuration information indicates to contain the first data in a payload, the controller may transmit the packet including the first data to the second node.

As set forth above, an apparatus of a second node in a wireless communication system according to various embodiments of the disclosure may include a transceiver and a controller, and the controller may be configured to transmit header configuration information to a first node, if header configuration information indicates to contain first data including one or more of network management information and user service provision information into a header, receive a packet including the first data and additional information for parsing the first data from the first node, and transmit a response to the first data to the first node.

According to various embodiments of the disclosure, the first data may be based on preconfigured header information table, and the header information table may include information representing the first data with bits.

According to various embodiments of the disclosure, the controller may transmit update information of the header configuration information to the first node.

According to various embodiments of the disclosure, if the header configuration information indicates to contain the first data in a payload, the controller may receive the packet including the first data from the first node.

According to various embodiments of the disclosure, the header configuration information may include identification information of the first data to determine a transmission position of the first data in the packet, and the identification information may include one or more of a name, an identification, a header format, a protocol in the header, a size and a type of the first data contained in the header.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first node in a wireless communication system, the method comprising:

receiving, from a second node, header configuration information;

transmitting, to the second node, a packet including first data and additional information for parsing the first data, in case that the header configuration information indicates containing the first data in a header; and receiving, from the second node, a response to the first data, wherein the first data includes at least one of network management information or user service information into the header, and wherein the first data and the additional information are contained in the header of the packet.

2. The method of claim 1, further comprising:

determining whether to contain the first data in the header or a payload of the packet, based on the header configuration information, wherein the header configuration information includes identification information of the first data to determine a transmission position of the first data in the packet, and wherein the identification information includes at least one of a name of the first data, an identification of the first data, a header format, a protocol in the header, or a size and a type of the first data contained in the header.

3. The method of claim 2, wherein the transmitting of the packet comprises:

transmitting, to the second node, the packet containing the first data, in case that the header configuration information indicates containing the first data in the payload.

4. The method of claim 1, wherein the first data is based on a preconfigured header information table, and wherein the preconfigured header information table includes information representing the first data with bits.

5. The method of claim 1, further comprising:

receiving, from the second node, update information of the header configuration information.

6. A method performed by a second node in a wireless communication system, the method comprising:

transmitting, to a first node, header configuration information;

receiving, from the first node, a packet including first data and additional information for parsing the first data, in case that the header configuration information indicates containing the first data in a header; and transmitting, to the first node, a response to the first data, wherein the first data includes at least one of network management information or user service information into the header, and wherein the first data and the additional information are contained in the header of the packet.

7. The method of claim 6, wherein the first data is based on a preconfigured header information table, and wherein the preconfigured header information table includes information representing the first data with bits.

8. The method of claim 7, wherein the receiving of the packet comprises:

receiving, from the first node, the packet containing the first data, in case that the header configuration information indicates containing the first data in the payload.

9. The method of claim 6, further comprising:

transmitting, to the first node, update information of the header configuration information.

10. The method of claim 6, wherein the header configuration information includes identification information of the first data to determine a transmission position of the first data in the packet, and wherein the identification information includes at least one of a name of the first data, an identification of the first data, a header format, a protocol in the header, or a size and a type of the first data contained in the header.

11. A first node in a wireless communication system, the first node comprising:

a transceiver; and at least one processor coupled with the transceiver and configured to:

receive, from a second node, header configuration information, transmit, to the second node, a packet including first data and additional information for parsing the first data, in case that the header configuration information indicates containing the first data in a header, receive, from the second node, a response to the first data, wherein the first data includes at least one of network management information or user service information into the header, and wherein the first data and the additional information are contained in the header of the packet.

12. The first node of claim 11, wherein the at least one processor is further configured to determine whether to contain the first data in the header or a payload of the packet, based on the header configuration information, wherein the header configuration information includes identification information of the first data to determine a transmission position of the first data in the packet, and wherein the identification information includes at least one of a name of the first data, an identification of the first data, a header format, a protocol in the header, or a size and a type of the first data contained in the header.

13. The first node of claim 12, wherein the at least one processor is further configured to:

transmit, to the second node, the packet containing the first data, in case that the header configuration information indicates containing the first data in the payload.

14. The first node of claim 11, wherein the first data is based on a preconfigured header information table, and wherein the preconfigured header information table includes information representing the first data with bits.

15. The first node of claim 11, wherein the at least one processor is further configured to:

receive, from the second node, update information of the header configuration information.

16. A second node in a wireless communication system, the second node comprising:

a transceiver; and at least one processor coupled with the transceiver and configured to:

transmit, to a first node, header configuration information, receive, from the first node, a packet including first data and additional information for parsing the first data, in case that the header configuration information indicates containing the first data in a header, and transmit, to the first node, a response to the first data, wherein the first data includes at least one of network management information or user service information into the header, and wherein the first data and the additional information are contained in the header of the packet.

17. The second node of claim 16, wherein the first data is based on a preconfigured header information table, and wherein the preconfigured header information table includes information representing the first data with bits.

18. The second node of claim 17, wherein the at least one processor is further configured to:

receive, from the first node, the packet containing the first data, in case that the header configuration information indicates containing the first data in a payload.

19. The second node of claim 16, wherein the at least one processor is further configured to:

transmit, to the first node, update information of the header configuration information.

20. The second node of claim 16, wherein the header configuration information includes identification information of the first data to determine a transmission position of the first data in the packet, and wherein the identification information includes at least one of a name of the first data, an identification of the first data, a header format, a protocol in the header, or a size and a type of the first data contained in the header.

* * * * *